(12) United States Patent
Jain

(10) Patent No.: US 11,108,718 B1
(45) Date of Patent: Aug. 31, 2021

(54) DECREASING DISTRACTIONS CAUSED BY MESSAGE OVERLOAD

(71) Applicant: Sandeep Jain, Davie, FL (US)

(72) Inventor: Sandeep Jain, Davie, FL (US)

( * ) Notice: Subject to any disclaimer, the term of this patent is extended or adjusted under 35 U.S.C. 154(b) by 0 days.

(21) Appl. No.: 16/827,461

(22) Filed: Mar. 23, 2020

(51) Int. Cl.
*G06F 15/16* (2006.01)
*H04L 12/58* (2006.01)

(52) U.S. Cl.
CPC ............ *H04L 51/12* (2013.01); *H04L 51/22* (2013.01); *H04L 51/24* (2013.01); *H04L 51/34* (2013.01)

(58) Field of Classification Search
CPC ....... H04L 51/24; H04L 51/046; H04L 51/28; H04L 51/12; H04L 51/22; H04L 51/04; H04L 51/30; H04L 51/20
See application file for complete search history.

(56) References Cited

U.S. PATENT DOCUMENTS

| | | | |
|---|---|---|---|
| 8,352,560 B2 * | 1/2013 | O'Sullivan | H04L 51/14 709/206 |
| 9,485,632 B2 * | 11/2016 | Yoakum | H04W 4/14 |
| 2009/0132662 A1 * | 5/2009 | Sheridan | H04L 51/26 709/206 |
| 2010/0115033 A1 * | 5/2010 | Geffner | G06Q 10/107 709/206 |
| 2014/0214973 A1 * | 7/2014 | DeLuca | H04L 51/26 709/206 |
| 2016/0127301 A1 * | 5/2016 | Jeoung | H04L 51/30 455/466 |

\* cited by examiner

*Primary Examiner* — Cheikh T Ndiaye
(74) *Attorney, Agent, or Firm* — Patents on Demand P.A.; Brian K. Buchheit

(57) ABSTRACT

Communications software that minimizes recipient distractions from receiving messages receives, at an application running on a computing device of an application user referred to as a sender, input for a message to a recipient address. A notice of the message is received from the application to the recipient address at a distraction free messaging (DFM) server. The DFM server querying settings established by a recipient linked to the recipient address to determine a delivery time for the message. The DFM server conveys over a network the delivery time to the application running on the computing device of the sender. At the delivery time, the DFM server delivering the message to the recipient address enabling the recipient to view the message as a delivered message, wherein prior to the delivery time the recipient is permitted to preview the message via a distraction free message application operating in a pre-delivery mode.

18 Claims, 10 Drawing Sheets

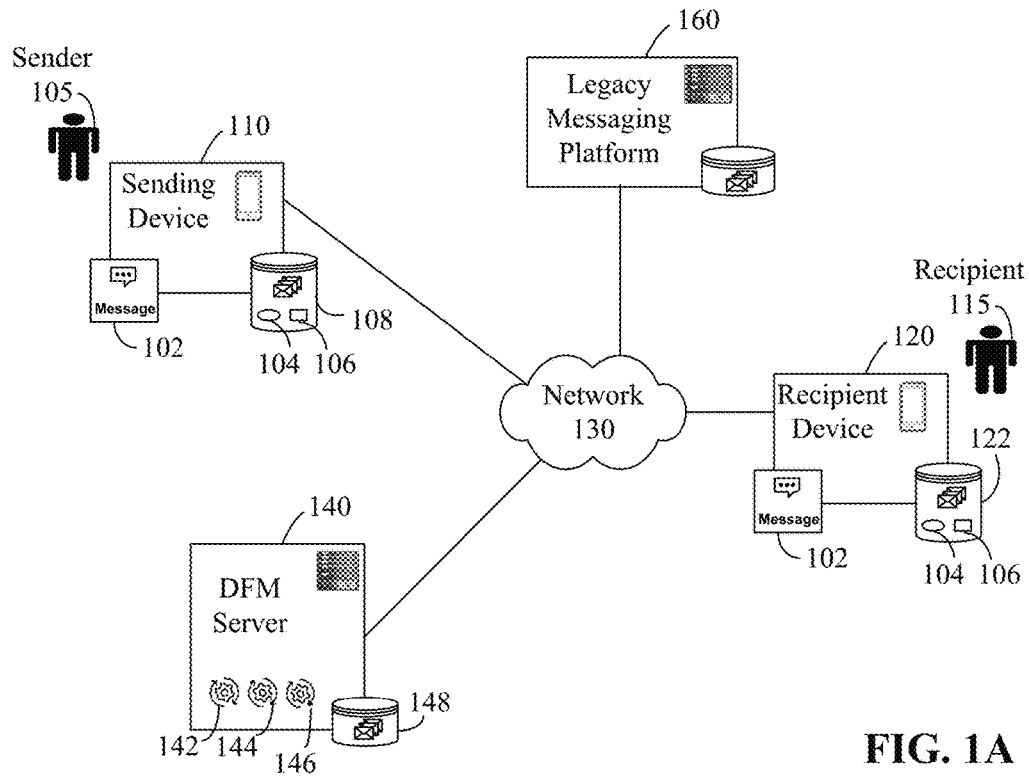
FIG. 1A
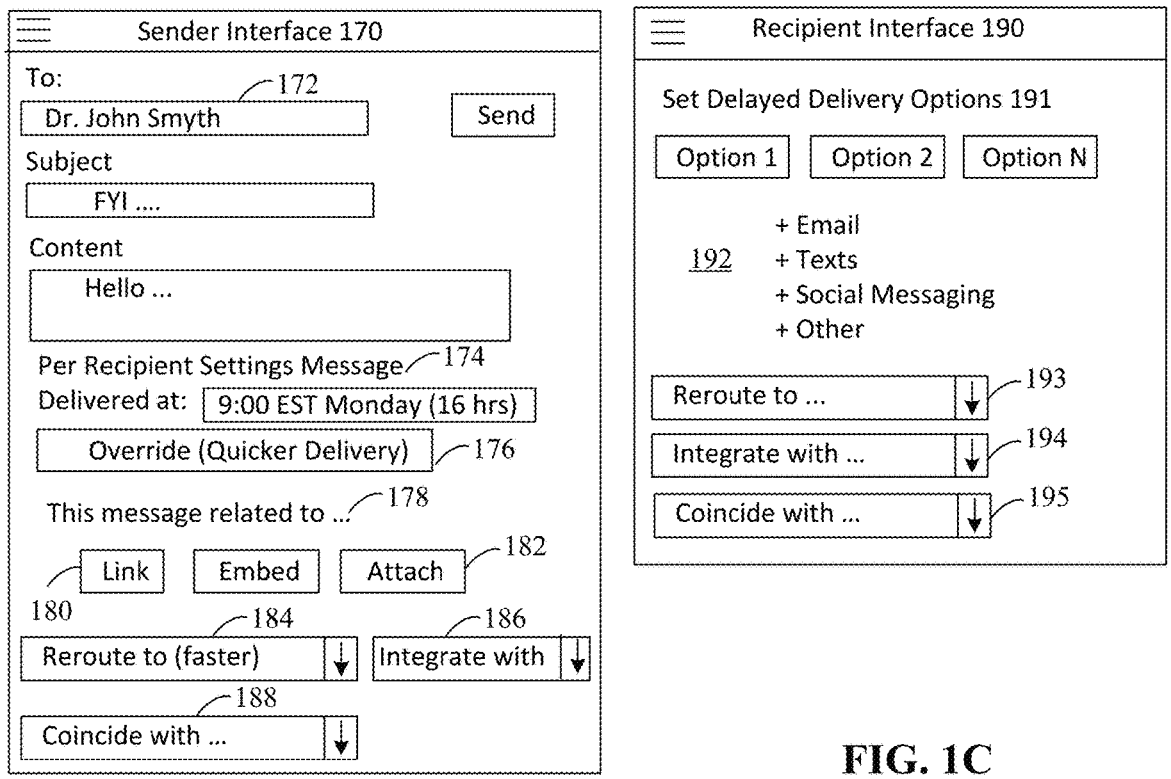
FIG. 1B
FIG. 1C

Delivery Block /805

Future Message List /835

Message Specific Settings /855

DECREASING DISTRACTIONS CAUSED BY MESSAGE OVERLOAD

CROSS-REFERENCE TO RELATED APPLICATIONS

This continuation in part application claims the benefit of U.S. patent application Ser. No. 15/827,172 filed on Nov. 30, 2017 titled "FUTURE MESSAGING MAXIMIZING CONTEXTUAL RELEVANCY AND MINIMIZING INFORMATION OVERLOAD BASED DISTRACTIONS" and U.S. patent application Ser. No. 16/212,897 filed on Dec. 7, 2018 titled "PRIVACY OPTIONS FOR PROFESSIONAL MESSAGING APPLICATION." The entire contents of U.S. application Ser. Nos. 15/827,172 and 16/212,897 are incorporated by reference in its entirety herein.

BACKGROUND

The present invention relates to the field of communications and distraction free messaging and, more particularly, to decreasing distractions caused by message overload.

Mobile devices have revolutionized the manner in which people are able to communicate, to share documents and photographs, to access internet and intranet content, and the like. Mobile device communications are rapid and easy to use, which results in large volumes of messages being sent/received and results in expectations of fast responses. Unlike other communications, which require a higher threshold of effort on the part of sender, which can result in more thoughtful expressions, short text messages are able to be sent at a whim, with little effort, contemplation, or thought. A sender of a text message, often expects a response within an hour of having sent a message; else the sender perceives a recipient is unhappy with the sender for some reason or another. These rapid expectations for message response combined large volumes of these types of messages results in regular interruptions, which can be highly distracting from a cognitive standpoint. Academics have begun to report negative effects on attention span, on instant gratification, on increasingly shallow core relationships and communications; all symptoms of mobile device addiction that is increasingly problematic in society.

Further, the breadth of different messaging systems and infrastructures makes message management challenging. Many individuals, for example, receive text messages from two or more different phone accounts, such as a professional and personal one in addition to receiving numerous email messages, intranet messages, social messaging messages, and the like. It is common for a portion of an extended conversation to extend over email, texting, and social media, which results in a more challenging time for a recipient or respondent to integrate all the messages relevant to a given subject. For example, a quick text can allude to years long conversations and topics expressed in email communications, which are generally not integrated/indexed to a text message reminder. As a result, people often have to endure a significant cognitive load prior to responding to a text message in order to refresh their memories on a topic through searching other message systems. As various forms of messaging increases, the load on recipients correspondingly increases, which further exasperates problems with information overload.

Providers of communication infrastructures are financially encouraged to provide stove-piped or non-integrated messaging systems, which further exasperates the problem. For example, FACEBOOK and related social media sites like INSTAGRAM are incentivized by advertising. This advertising revenue increases through engagement or time spent by an end user within a given application. Thus, there is a financial disincentive for these providers to reduce the cognitive load on their end users. Doing so, minimizes opportunities for "eyeballs" that minimizes opportunities for advertising revenue. The messaging revenue model that is based on advertising has encouraged "bot farms" and other automated mechanisms that increase messaging load to increase revenue and/or the effectiveness and penetration of an advertising campaign. Consequently, the number of messages a person receives through multiple channels continues to increase. The time required to sort through important messages and respond timely also continues to increase, due to not only the ease of communications, the increased access for simple communications, but also due to infrastructure considerations and profit motivations.

The advertising revenue cycle also encourages multiple log-ins and check-ins, which are fundamentally distracting to human beings, which again increases the cognitive load on effective communications. Stated simply, GMAIL, FACEBOOK, INSTAGRAM, and other advertisement-based messaging systems increase their profits by increasing the time users spend engaged with these messaging applications. There is no inherent incentive and strong practical disincentives to minimize the time users spend digesting and engaging with messages from others. Video attachments and other time-dependent challenging to consume items further increase cognitive load type problems experienced by end-users.

No viable solutions exist or have even been sought to minimize the cognitive load of dealing with message overload. None has been reasonably contemplated and disincentives are built into the system. Without a means of addressing this increasing predominate issue, the balance between the value of easy communications via messaging mechanisms will continue to diminish relative to the cognitive load of effective engagement.

BRIEF DESCRIPTION OF THE SEVERAL VIEWS OF THE DRAWINGS

FIG. 1A shows a schematic diagram of a communication system incorporating distraction free messaging in accordance with embodiments of the disclosure.

FIG. 1B shows a sender user interface incorporating distraction free messaging in accordance with embodiments of the disclosure.

FIG. 1C shows a sender user interface incorporating distraction free messaging in accordance with embodiments of the disclosure.

DETAILED DESCRIPTION

Figure 2:
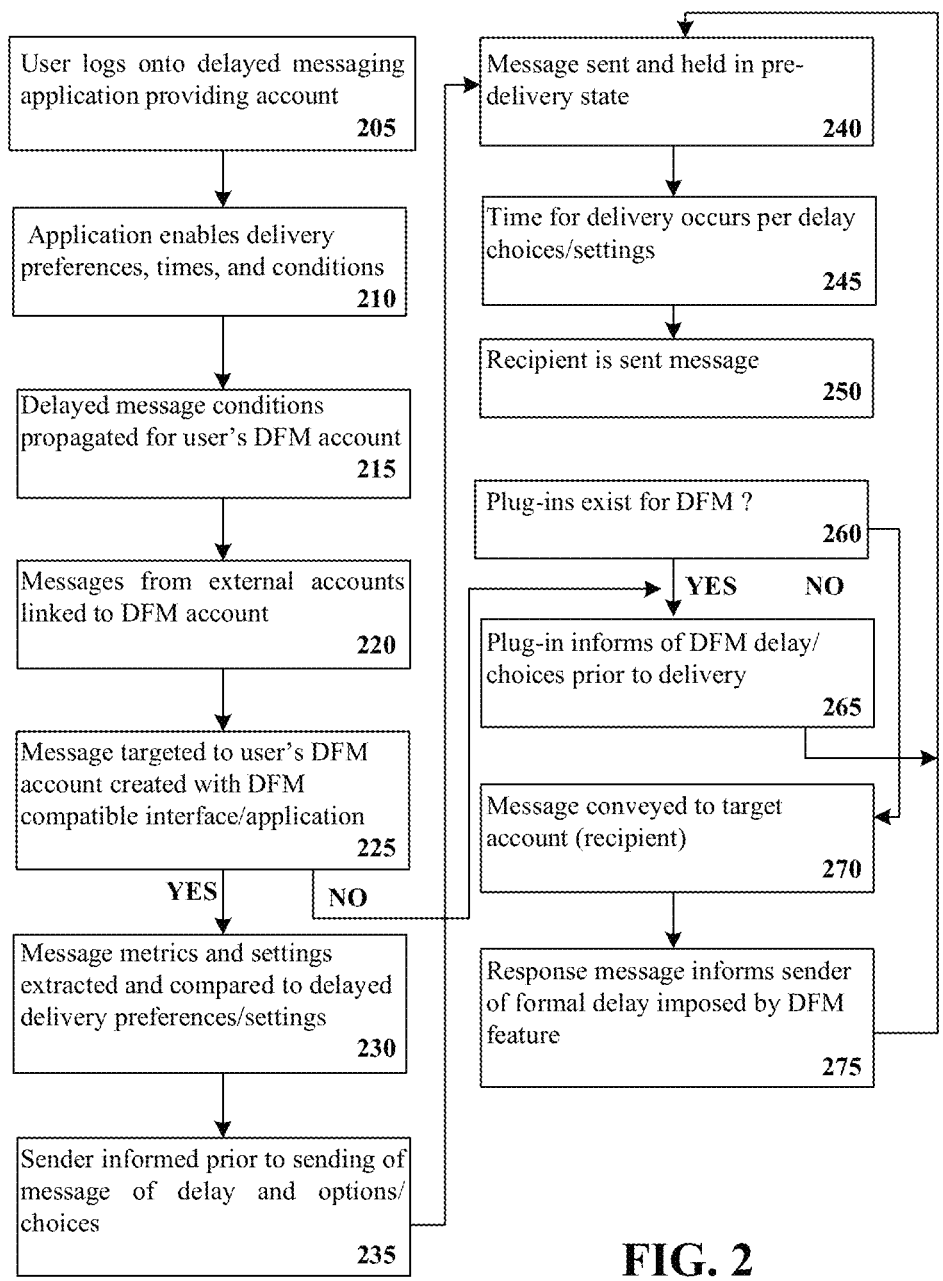
FIG. 2 shows a flow chart for a process of implementing delayed message delivery to a delayed messaging account in accordance with an embodiment of the disclosure.

Embodiments of the disclosure are directed to messaging for mobile devices, which permits message recipients to communicate intelligently without experiencing significant data overload or to at least diminish the cognitive load needed for effective communications over one or more messaging platforms. The general category for which inventive mechanisms have been incorporated is distraction free messaging. In practice, distraction free messaging includes concepts of delayed message delivery, message aggregation across platforms, and non-conventional response options such as pre-delivery responses and review. Distraction free messaging specifics will be detailed further herein, both from an end-user perception perspective and a technological one, which are divergent perspectives as detailed.

A key to reducing cognitive load through distraction free messaging relates to permitting a message recipient to respond to organized messages in bulk, at times convenient to the recipient, based on multi-sources of platforms of messaging, while managing expectations of message senders. That is message senders typically assume that a message is received and processed at the time it is sent. Delays in responses based on this expectation are psychologically treated as a lack of caring about the issue being communicated. For example, when a person texts another and does not receive a response for over a day, this delay is often perceived as a personal slight. The invention permits a message recipient to establish time windows based on his/her schedule for reading messages based on recipient established categories. The sender of a message to such a person is informed that a message delivery to the recipient will be delayed until that time. By establishing a sending delay on a message, a sender's expectations of a response are tolled until a time of delivery. In embodiments, senders are provided recipient-established windows for message delivery times, which are selected by the sender. Thus, if a sender is conveying a "joke" or a light communication, a time to review such light hearted communications may be towards the end of a day or during natural breaks of a recipient. Similarly, if a sender is having an emergency or is in crisis, more immediate options are presented to a sender. Different filters can apply for different groups of people or delivery times. Since both the sender and recipient are aware of time-constraints on messages, a social contract for reduced cognitive load of the messages is established and expectations are adjusted. The above concept is referred to as delayed message delivery, which is central to this disclosure. A message recipient is not "dinged" such as through a text message alert until the delayed time of delivery. Thus, the message recipient is not constantly distracted through receipt of messages, which reduces an effective cognitive load for such messages.

Although the concept of delayed messaging delivery appears to be self-explanatory, its interpersonal meaning as understood between senders and recipients is divergent from its technical implementation. As a practical matter, recipients of messages often utilize messaging tools and platforms that do not and will not permit delays in reception. The reasoning is linked to the technological protocols implemented for these systems and the financial incentives of the platform providers. As noted in the background, platform providers receive advantages from interrupting message recipients and ensuring a maximum amount of time is spent on a messaging application, which adversely increases the cognitive load on the recipient. To bridge these concerns, actual messages sent may technologically be delivered immediately to an inbox of a recipient. These messaging platforms, however, allow for message redirection, such as to different mailboxes, allow for different priorities, and/or have user configurable auto-reply, out-of-office, and other such configurable parameters. Thus, some level of delay filtering and automated responses are contemplated. The disclosure adapts these mechanisms to generate an effect of a delayed message delivery according to recipient established parameters.

The second concept in distraction free messaging is aggregating content or data needed to respond to a received message into a single "location." This aggregation goes beyond the grouping of email messages by "thread" and brings in messages from different platforms, such as text messaging, email, social messaging, and intranets. In one embodiment, different types of communications can be organized in a collapsible hierarchy. Further, basic suggestions with links to related messages can be prompted when reading a message. The level of aggregation and integration of messages from across different platforms can be user configurable and reasonable thresholds can be established. Ultimately, a message recipient is able to utilize a single user interface to receive messages from different platforms, where the messages are organized across these platforms to facilitate responses. Accordingly, users need not be distracted by the actual user interfaces of these divergent platforms that are expressly designed to distract and increase engagement for advertising purposes. A user may still utilize the "native" interface of the individual platforms, but when distraction free messaging is desired the unified or aggregation interface that incorporates delayed message delivery can be utilized.

The third concept integrated in distraction free messaging includes non-conventional response options such as pre-delivery responses, partially automated responses, content inclusion suggestions, and cross platform integration. Because from a technology perspective, delayed messages are actually physically delivered prior to the delayed delivery time, an end-user may read and respond to these messages prior to the delivery time. Such responses are referred to as pre-delivery responses consistent with the user and recipient perceptions that the message delivery itself is being delayed. Because messages are aggregated across different platforms, many responses may also be facilitated through suggested content additions. For example, a user may have provided an attachment via an email that directly responds to a question appearing in a text message. Distraction free messages can determine the relevancy of the email and suggest that the attachment previously included in an email be added to a text message response. This saves the recipient the time/effort of looking up the email and sending it to the recipient in a different form via a different platform. Similarly, it saves the recipient from receiving a text message of "see email" and the corresponding cognitive load of accessing a different platform to receive the "answer" requested from a text.

As will be appreciated by one skilled in the art, aspects of the present invention may be embodied as a system, method, downloadable device app, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. The program code may also execute at least in part on a smart phone, tablet, gaming console, smart consumer electronic device, or embedded device. In a hybrid processing scenario where program code executes partially on a client and partially on at least one remote computers, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a schematic diagram 100 of a communication system incorporating distraction free messaging in accordance with embodiments of the disclosure. FIG. 1B shows a sender user interface incorporating distraction free messaging in accordance with embodiments of the disclosure. FIG. 1C shows a sender user interface incorporating distraction free messaging in accordance with embodiments of the disclosure. In system 100, sender 105 using sending device 110 running a distraction free messaging (DFM) application 102 creates and conveys messages over network 130 to one or more recipients 115, which are received at the recipient device 120. The DFM messages include features/functions for delayed message delivery 142, message aggregation 144, non-conventional DFM options 146 implemented in DFM server 140 and/or built into the DFM application 102. DFM messages implement one or more innovations detailed herein that minimize attention diverting cognitive loads on participants as detailed herein while maintaining the positive advantages of traditional messages.

From a sender 105 perspective, a sender 105 is able to utilize delayed message delivery in accordance with parameters pre-established by a recipient 115. That is, a sender 105 is informed of a delayed time of delivery of a message at the time it is sent, which manages sender expectations regarding recipient responses. The recipient 115 is able to dictate time periods of minimal distraction and delivery windows for different types of messages from different types of senders, which ensures that the recipient 115 is able to handle message intake in bulk at times convenient for his/her schedule. Thus, the recipient 120 is not being constantly distracted or pinged by messages received at adhoc times, which impose a cognitive load to digest and respond in a "timely" manner. Additionally, both sender 105 and recipient 115 can benefit from message aggregation features, which permit a constructed/received DFM message to be linked to aggregated to other messages sent/received in the past. This helps provide message context, permits cross-platform aggregations that decrease cognitive load on the participants, and facilitates content input and responses to minimize communication times. Finally, additional non-conventional DFM options are available, such as options to reroute messages to suggested people, to integrate messages with external content and links, and to have a DFM message coincide with a scheduled event, such as a physical meeting between participants. The various functions and features are provided in more detail in other portions of the disclosure and the above is designed to function as an overview.

Illustrative interfaces 170, 190 demonstrates some functionality experienced by sender 105 and recipient 115 through user interfaces of the DFM application 102. A sender is able to construct DFM messages that specific a recipient, subject, and content 172 consistent with conventional messaging features. Interface 170 informs the sender 105 of an anticipated delivery time 174 consistent with delayed delivery options 191 specified by the recipient 115. In embodiments, a sender 105 may override 176 any delivery delay should a message being sent through interface 170 be urgent. Delivery options 191 are configurable to permit sender overrides, to inhibit them, or to only provide them under recipient specified conditions. In many instances, politeness and behavioral norms based on recipient expectations will be sufficient to deter overly aggressive and distraction inducing overrides, such as those available through override 176. Specific senders 105 that abuse recipient's expectations can be individually blocked from utilizing override 176 features/options in embodiments.

In embodiments, a sender's interface 170 may suggest related messages 178 and provide easy mechanisms to link past messages 180, convey portions of past messages or include related content for context to the DFM, as indicated by option 182. A recipient interface 190 similarly aggregates content related to a DFM, such as showing sets of emails, texts, social messages, or other content related to a message upon receipt. The aggregation features minimize cognitive overload/load on both the sender 105 and recipient to provide context to a DFM and enables cross platform messages and content to be easily integrated/referenced. Many users experience problems with receiving/sending messages via different modalities, such as text and email, where each modality offers only part of a communication, which introduces overhead of searching through different interfaces to ensure both communication participants are sharing a common understanding. Stated different, short communications, such as texts and tweets, are often non-nuanced and subject to misinterpretation, which is a problem minimized by having additional context.

Interface 170 permits additional DFM options such as rerouting a message to a suggested party 184 for faster handling. This option is related to delayed delivery options where other individuals related to a recipient 190 may be involved, such as secretaries, co-workers, or peers. Particularly busy recipients 190 often have gatekeepers that help respond to numerous messages and/or that filter or screen for urgency to minimize recipient 115 overhead. The suggested party 184 options permit recipients 115 to expose the sender 105 to appropriate alternative message delivery targets, such as these gatekeepers. Often, senders 105 lack such information, and may lack direct communication addresses for alternative targets. Recipients may expressly add rerouting 193 targets manually or automatically as well. DFM messages can also be integrated with broader topics 186 or categories, such as "political humor", "family matters" and the like. Sometimes groups, external context like mimes, and the like generally apply to the DFM, which a sender can specify via integration option 186. Recipients 115 likewise can manually or automatically establish integration options 194. Further, a DFM may coincide with an external task or event, such is specifiable in the coincide option 188, 195. For example, sender 105 may be meeting with recipient 115 later in the day/week and the DFM message is expressly related to that event. By utilizing the coincide option 188, 195, a DFM can travel with the event, so that it is presented at the time of the event and/or readily accessible in conjunction with event reminders. If an event is rescheduled, the DFM coinciding with the event (188, 195) will be automatically shifted with the event in response.

DFM features are available from a tailored DFM application 102 and interface 170, 190, which may be facilitated by a DFM server 140 expressly designed to implement/enable the DFM functionality. The disclosure recognizes, however, that senders 105 and recipients 115 often communication through multiple different messaging applications 104, which are part of legacy messaging platforms 160. These apps 104 and platforms 160 may lack DFM specific functionality implemented through tailored interface mechanisms (i.e., interface 170, 190) and/or DFM specific code, such as that for delayed message delivery 142, message aggregation 144, and non-conventional options 146. In some circumstances, on device 110, 120 plug-ins may be integrated to messaging apps 104 to add functionality and DFM features. Further, some user configurable settings/options 106 of the messaging apps 104 linked to legacy messaging platforms 160 may be implemented to provide portions of the DFM functionality detailed herein. Specifics for integration of DFM features to legacy platforms 160 shall be elaborated in greater detail throughout the disclosure. It is contemplated that a sender 105 may not utilize sending interface 170 having DFM features and instead may utilize a legacy interface of a messaging app 104 on legacy messaging platform 160, yet a recipient 115 may receive such conventional messages within interface 190, which enables recipient-facing DFM features. Conversely, recipient 120 may not utilizing recipient interface 190 and may only receive messages via messaging apps 104 supported by legacy platforms 160, yet sender 105 can utilize interface 170 with DFM feature advantages. As DFM features increase in usage are adopted by communication participants (105, 115) it is anticipated that legacy messaging platforms 160 will adapt internal code and features to add the DFM features natively, which participants (105, 115) prefer. Given an existence of divergent consumer desires (i.e., consumers desire distraction free, convenient messages across different convenient protocols/platforms) from platform advertising revenue sources (i.e., many messaging platforms, such as FACEBOOK, INSTAGRAM, and GMAIL, receive advertisement revenue that grows based on time spent in an application or user engagement that encourages consumer distractions and increases communication consumption cognitively load) as detailed in the disclosure, even anticipated adaptations of some DFM features within legacy messaging platforms 160 and apps 104 will likely be inferior to pure implementations facilitated by server 140, DFM app 102, and interfaces 170, 190.

In one embodiment, the DFM features are able to be implemented at least in part utilizing one or more Internet of Things (IoT) devices. The Internet of Things (IoT) has the potential to give companies valuable operational insights through an array of sensor-driven smart devices that actively gather and transmit performance data. It is estimated that the total number of IoT connections will reach 25 billion by 2025, with the industrial segment comprising approximately 14 billion connections while the IoT connections in the consumer segment will reach 11.4 billion. In other words, it is contemplated that IoT related devices/connections will grow and the DFM features will be integrated with this IoT growth.

For instance, one of the emerging challenges in IoT implementation is data management. Specifically, avoiding overload and ensuring the transmission of relevant data in a timely manner. Numerous case studies indicate how infrastructure (storage and transmitting) costs are rising accommodate the deluge of data, but only of a fraction of the gathered data is relevant to deriving business and operational insights. Moreover, the storage/transmitting costs linked to IoT implementations/devices can be intelligently aggregated, such as through adhoc and peer to peer networks. Storage space needed for DFM and for privacy are manageable by IoT linked data storages and processors. Thus, the load of DFM messages utilized in conjunction with IoT strikes a balance between cost, performance, and security. Overall, the problems of information overload inherent as intelligent devices, such as IoT ones, propagate are mitigated/resolved through DFM features as detailed herein. Similarly, costs and infrastructure for implementing DFM features are able to leverage excess capacity of IoT networks and devices.

That is, distraction free messaging and DFM features can be applied in the context of IoT to aggregating data streams from different platforms (or equipment) and organizing them in terms of hierarchy or pre-set rule such as a threshold value (e.g. transmit data stream only if power consumption exceeds a certain value) or a time stamp (e.g. transmit equipment power consumption data only on Sunday at noon to facilitate weekly power usage data analytics). Distraction free messaging is a powerful mechanism for IoT data aggregators and platforms to curate IoT data into more meaningful, relevant and efficient data streams, that facilitate more insightful business and operational insights. Further, data security, filtering, privacy protection, etc. are all settings enabled through a DFM server integrated into IoT networked devices as understandable to one of ordinary skill from the disclosure presented herein.

FIG. 2 shows a flow chart for a process of implementing delayed message delivery to a delayed messaging account in accordance with an embodiment of the disclosure. The process 200 begins in step 205, where a DFM user, also referred to as a DFM recipient, logs onto a delayed messaging application to set their preferences. In step 210, the end user establishes different categories, senders, message types, and other conditions and preferences collectively referred to as Delayed Settings for their DFM account. In step 215 the Delayed Settings are stored in the DFM server responsible for managing the DFM account. In one embodiment, the DFM user may have multiple accounts with legacy systems, which is addressed in more detail in FIG. 5.

After the Delayed Settings are established, messages from users can be received targeting the DMF account with the established delay settings. Messages can be sent from a senders DFM application or from a non-DFM messaging platform referred to as a legacy platform, as shown by step 220. Assuming a message is sent from a DFM application, the method proceeds to step 225. A sender initiates a message targeting the recipient's DFM account, which is the recipient address. When a recipient DFM account is targeted, the sender's DFM application informs the DFM server, prior to message completion, of the intended sending of the message to the recipient. Upon being informed, in step 230, the DFM server looks up Delayed Settings of the recipient relevant to the message being sent and conveys this information to the sender's DFM application. In step 235, the sender's DFM application presents the sender with the anticipated message delivery time, which includes a delivery delay consistent with the Delayed Settings. The sender, being aware of this, will decide to "pre-send" the message not expecting a response until delivery. If a sender has an urgent need, they can opt to contact the recipient in another more urgent manner. In embodiments, options for expedited delivery can be provided via the DFM app. In step 240, the message is conveyed from the sender, is conveyed over a network to the DFM server, and is held for delivery in a pre-delivery state. In one embodiment, recipients may be able to view not-yet or predelivery messages. This can be advantageous for situations where a *nexus* exists between the recipient and the send/message prior to the delivery time. Advantageously, however, the recipient is not needlessly interrupted or distracted by the message pre-deliver to minimize distractions and the options for pre-viewing messages are "pulled" by the recipient instead of pushed at a time of a sender's choosing. In step 245, delivery of the message occurs at the designated delivery time. In step 250, the recipient is conveyed the message. In embodiments, a notification of delivery can be sent to the recipient, but such notifications are unnecessary in all embodiments. In simple terms, an option for a "read receipt" at time of delivery is considered and compatible with delayed message delivery as detailed herein.

The process detailed in FIG. 2 may function with some variations when a sender is not utilizing a DFM application, nonetheless the benefits of delayed delivery are available to the recipient, who is not constantly distracted with disjoint messages. Sender use of a non-DFM application are referred to as legacy messaging and are shown by progressing from step 220 to step 260. Step 260 denotes that for many existing "legacy" applications plug-ins are available, such as through MS OUTLOOK. A plug-in can effectively grant approximately equivalent functionality as detailed from the DFM application itself, or at least a close proximity depending on the limitations of the tools in question. For example, prior to message conveyance and in step 265, a plugin may inform a sender of the delivery preferences of the recipient similar to step 235. When no plug-ins are available, the message is conveyed from the sending application to the target account hosted by a DFM server, as shown by step 270. In step 275, the DFM server can convey a message, via email, text, or the modality most used by the application in question, to the sender informing the sender that the message is being delayed to minimize distractions to the recipient per recipient settings. Thus, the sender is aware of the delay, which helps manage expectations of a response. This type of message conveyance is similar to (and can be implemented by) automated responses associated with user-established rules in embodiments. After step 275, the message is held (step 240) until the designated time (step 245) at which point it is delivered (step 250).

Figure 5:
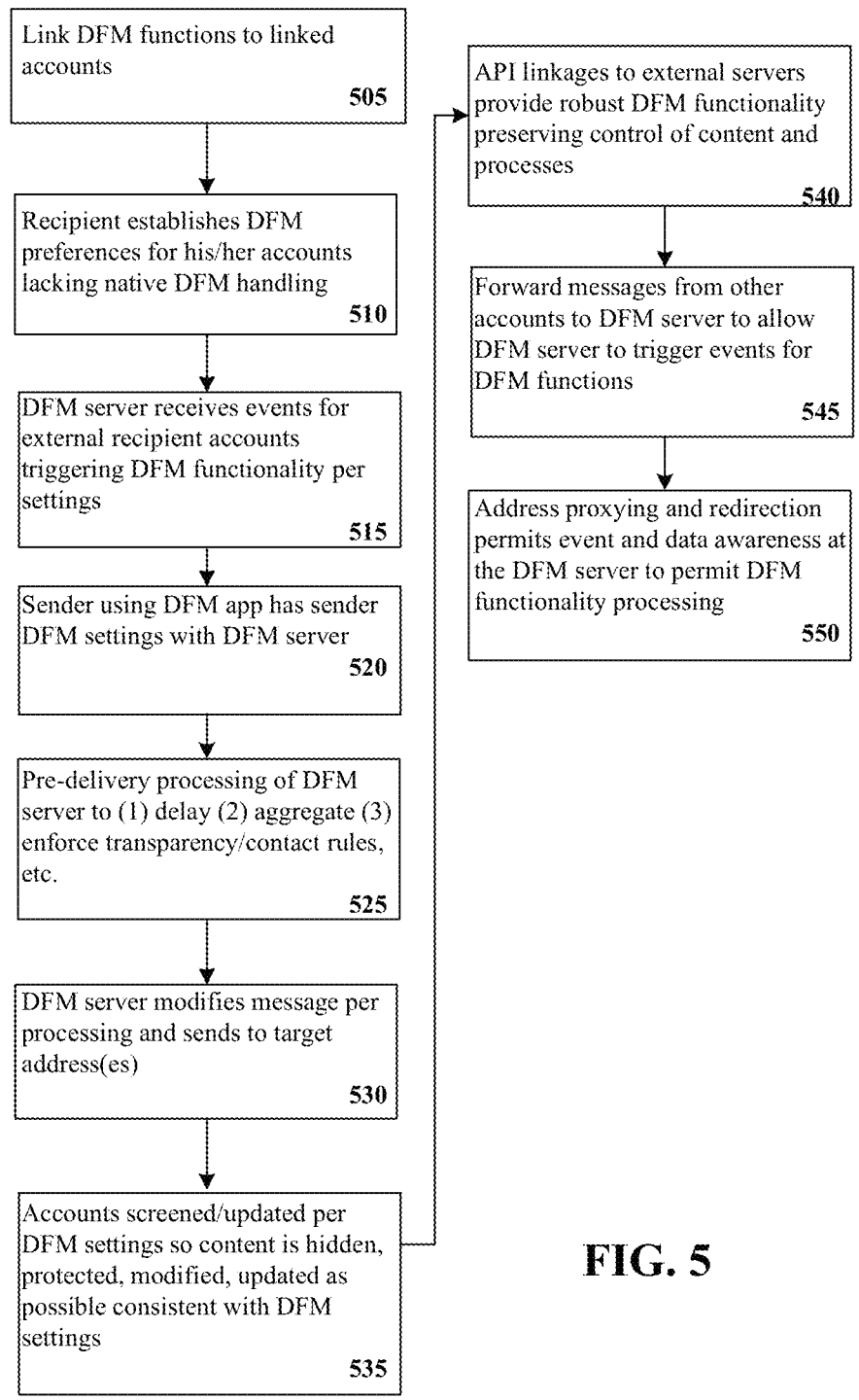
FIG. 5 shows a process of implementing DFM features for a recipient account not directly associated with a DFM server in accordance with an embodiment of the disclosure.

Although FIG. 2 shows a simplified example of delayed message delivery able to be implemented within DFM application and legacy sending systems, it should be understood that variations and alternatives to these simple descriptions are contemplated as being in scope of embodiments of the disclosure. FIG. 5, for example, elaborates upon some of the process modifications utilized in an embodiment where the recipient has established delayed message delivery or other DFM feature, yet the application that the messages are delivered to (i.e., target address) are for a legacy system that does not inherently delay delivery (step 240, 245). As a simple example, messages directed to non-DFM server accounts can be forwarded to the DFM server, which introduces the delays established by the recipient along with messages (step 235 and/or 270) to senders t manage response expectations. In such a case, the sender target account may receive the message immediately, but it is understood that reading through the "primary" DFM managed account will be delayed so that a rapid response is not to be expected.

Additionally, although FIG. 2 gives a simplified example where messages are stored within a DFM server (i.e., step 240) alternative delivery, delay, and storage mechanisms are contemplated within scope of the disclosure. To elaborate, in many situations, messages are highly sensitive and/or represent a significant amount of "value" to the message delivery system. An example of sensitive messages can include medical records having confidentiality requirements that a secure message system may adopt. An example of "value" based messaging includes GMAIL and FACEBOOK, which store messages in exchange for insight into direct advertising to the recipient and sender. In the former situation, a DFM server may not be trusted to comply with all the security features and privacy features of the "host" system. In the later example, the advantages achieved by advertisement-based messaging models may result in a reluctance to convey messages to the DFM server, which in theory permit the DFM server to compete with the same underlying advertisement-valued information. Regardless of the reasons, an entry barrier to adoption of the DFM features that are not organically implemented exists.

Embodiments of the disclosure contemplate a low-footprint message retention option that satisfies both of the above concerns and minimizes entry barriers. From a practical end, implementation of DFM features without the overhead of storage is also economical to implementers of these features. A set of application program interfaces (APIs) can be utilized that are provided linkages to messages and/or their storage in an external system. The content of the messages need not be conveyed or stored within a DFM server in any manner. Instead, enough information to determinate message metrics associated with delayed delivery (step 230) is conveyed for ma "host" or application to the DFM server, which determines the appropriate message to a sender and the appropriate delay to the impose in the message. Even for applications and/or servers that insist on immediate delivery (which is still viable), the messages can be annotated with a note from the DFM server, which does not store content, to indicate the delayed delivery time. The DFM server can determine when the delayed delivery time occurs and can retrigger (via an external message to the server) that the message be resent from the storage location and/or raised in priority so that it appears "at the top" of the delivered items. As noted herein, a balance is therefore achieved where all DFM functionality are being controlled by the DFM server and code, while other messaging systems store all message content and actually control target accounts and communication protocols.

Although APIs linking to servers are contemplated as described, equivalent functionality can be achieved through message redirections (i.e., use of an intermediary) that is common for SPAM filters and SPAM programs. For example, a message receiving application and/or message saving application can be redirected to the DFM server at message sending/receiving time, which traps an event and determines DFM features to apply, while forwarding the message onto the address designated by the message content server. This later implementation is application and/or plug-in driven and need not include embedded links to the underlying content servers. Of course, use of APIs and cooperative agreements with message retention servers is another avenue to achieve the functionality and may be more robust in terms of feature sets.

Finally, in embodiments, for efficiency, speed, and customer satisfaction, licensing arrangements may be established for DFM functionality that is able to be implemented directly into the feature set of a message retention server. Implementation specifics will vary based on business realities and agreements, which is acknowledged herein and which is to be considered when defining the scope of the implementation specifics for the detailed functionality in context of the level of ordinary skill in the art.

Figure 3:
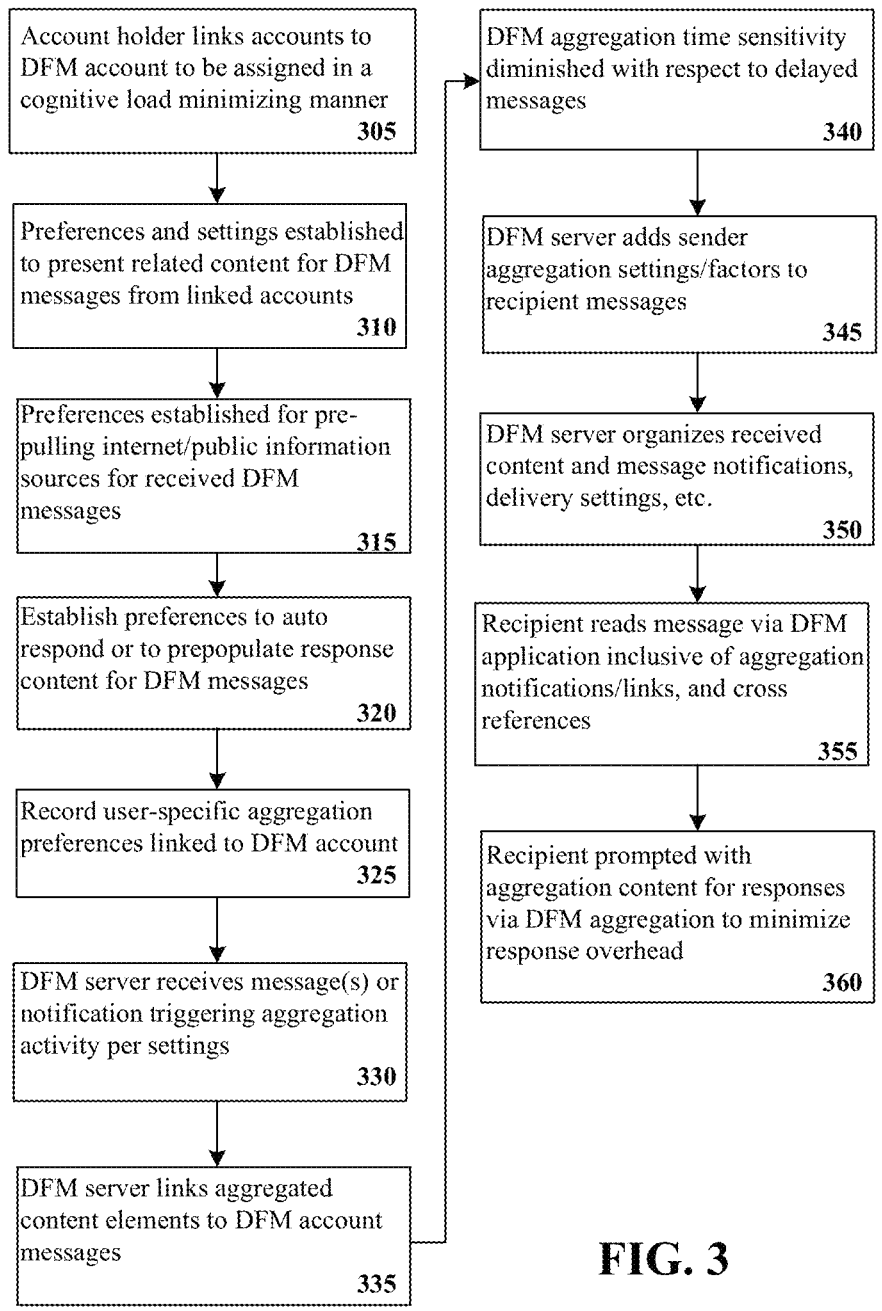
FIG. 3 shows a flow chart for a process of implementing message aggregation features of DFM in accordance with an embodiment of the disclosure.

FIG. 3 shows a flow chart for a process of implementing message aggregation features of DFM in accordance with an embodiment of the disclosure. In one embodiment, message aggregation permits a recipient of messages to pre-view of see delayed messages prior to the guaranteed delivery time. Further, message aggregation groups information from multiple diverse communication platforms together, so that the recipient is able to quickly review all the information relevant to a received message. Additionally, embodiments of the disclosure contemplate proactively collecting additional information in accordance with recipient settings to assist the user in consuming a complex message or one for which the recipient would otherwise have to seek additional context. Finally, message aggregation provides a set of features that permits a recipient to quickly respond through pre-constructed, context specific message options. The key to the message aggregation features is to group all relevant information for a recipient to respond together so that messages are easily consumed with minimal amounts of distraction. A balance between information presentation and overload is a challenging one to strike, so a majority of aggregation features are able to be customized and/or subdued for given recipients per the recipient specific settings. Effectively, message aggregation features combine intelligent assistance to minimize overhead in content consumption. A recipient need not access multiple divergent sources, such as texts, email, and social media, to respond to a "conversation" that spanned all of these different platforms. The need for aggregation increases as text communications, email communications, intranet communications, and professional messaging systems overlap significantly in today's communication paradigm; yet conventional communication systems have disincentives to minimize consumption time somewhat due to advertisement-based models that intentionally consume a user's attention and intentionally distract the user, which is becoming an increasing concern.

The process of FIG. 3 starts in step 305, where an account holder links one of more additional account to the DFM account. These linked accounts are those from which messages and communications are able to be aggregated through a DFM feature designed to minimize cognitive load. In embodiments, linking accounts results in access to these accounts being granted to the DFM server in some manner. Account identifiers and access mechanisms are provided in the linking stage. In step 310, preferences are established to present related-content for received DFM messages from linked accounts. Linked accounts include text messaging accounts, email accounts, social network accounts, chat accounts, and the like. Content presentation can include a presentation of a link to access the content, an expandable hierarchy for selecting/accessing related messages, having hover-sensitive summaries of related content with an ability to link to them, having embedded content summaries/links in different modes selectively hidden, and the like. The focus is to integrate content from multiple sources to minimize user cognitive overhead in general. That is, to strike a balance with prompting a user with related material without overloading the user, such that the aggregation is a smooth aid that reduces mental processing of a communicator instead of increasing the load to digest extraneous information. As noted, users establish preferences to tailor this balance.

One option in this respect is to pull information from the internet of public sources to aid a DFM account holder in digesting a message, as indicated by step 315. Simple practice examples of this are having tools for providing definitions, acronyms, or summaries for popular events that a reader may not be fully familiar with. This type of aid is especially helpful for short communications like text messages, which by their nature are often assuming a common understanding of oblique/terse references that does not always exist. The consumption/understanding aids for digesting content include options to pre-populate responses and/or to automatically respond to some messages, as indicated in step 320. In the pre-population, content from other sources, such as suggested attachments for requests indicating a desire for stored documents, is contemplated. Also contemplated are short context-based auto messages including those derived from related communications occurring on diverse platforms. As with other DFM features, a key to aggregation functionality is to reduce cognitive and interactive friction during communications, typically in an unobtrusive/subtle manner. In step 325, the user specific aggregation preferences of the DFM and linked accounts are recorded.

Once recorded, the DFM server receives messages and/or status indications, which trigger aggregation activities per the account holder's settings, as shown in step 330. In step 335, the DFM server can link aggregated content elements to DFM account messages. For example, a text requesting an update sent to a user's phone account can be noted next to a DFM account email message conveyed on the same issue. In embodiments, linking accounts were one or more of the linked accounts (i.e., the DFM account) includes delayed messaging results in at least messages being sent to senders regarding the anticipated delivery times, which helps manage sender expectations of when to anticipate a response. Some message aggregation functions may be processor intensive in that an appreciable level of artificial intelligence and/or deep, content-based record searching, content analysis, and the like may be involved. In situations where one or more message is delayed per DFM functionality, the time sensitivity for aggregation functions may be mitigated, as shown by step 340. That is, since some messages are benign inherently delayed per recipient preferences to ensure that distractions are minimized, there is no "rush" in processing aggregation features for already delayed message delivery. Simply put, off-peak and "as available" processing may be utilized for significant aggregation functions in contemplated embodiments to minimize implementation cost and system load. Further, divergent levels of processing depth for aggregation functions can be utilized, where "lighter" processing tasks are handled in an expedited manner and more challenging ones may be deferred until resources are available.

In step 345, the DFM server adds sender aggregation elements/parameters to recipient message(s) when the sender has enabled such DFM functionality. In other words, not only do the recipient's aggregation settings facilitate message consumption/response, but sender content can be utilized as well. For example, a brief message to a DFM recipient from a sender may reference a meeting on Monday in a slightly obscure manner. The sender's messages to others, however, may include a meeting agenda, meeting title, and additional content that was not conveyed to the brief message recipient. The DFM server may include aggregating information for the sender that links the brief message to the other sender content, which is shared to the recipient's account so that the recipient is presented the meeting agenda, title, and additional content about the meeting. This conveyance occurs despite no other messages directed to the recipient including this content and despite the sender never expressly sending this information no the recipient. Sender settings as well as recipient ones are utilized to ensure confidential and inappropriate content is not conveyed to others. In some instances, a sender or content controller will be prompted for approval prior to inclusion to a recipient by the DFM server.

In step 350, the DFM server receives message notifications and/or content and organizes it in accordance with account holder settings. DFM aggregation events are triggered and processes occur. These processes can result in content addendums, in content overlays, in separate messages linking to additional content that are presented to users, to automatic responses, and/or to prepopulated responses, as mentioned. Messages, post processing for DFM aggregation, are conveyed to recipients. In step 355, a recipient reads a message via the DFM interface/application that is inclusive of aggregation elements, such as annotations, links, cross references, etc. In step 360, the recipient is prompted with aggregation content for some pre-filled responses, which minimizes response overhead. In embodiments, concurrent messages and/or short annotations may be conveyed in response to extra platform messaging to linked accounts, such that the linked accounts indicate a DFM message has been sent in response, which minimizes overhead to a user and concurrently ensures recipients are aware of the DFM account holder's response.

Figure 4:
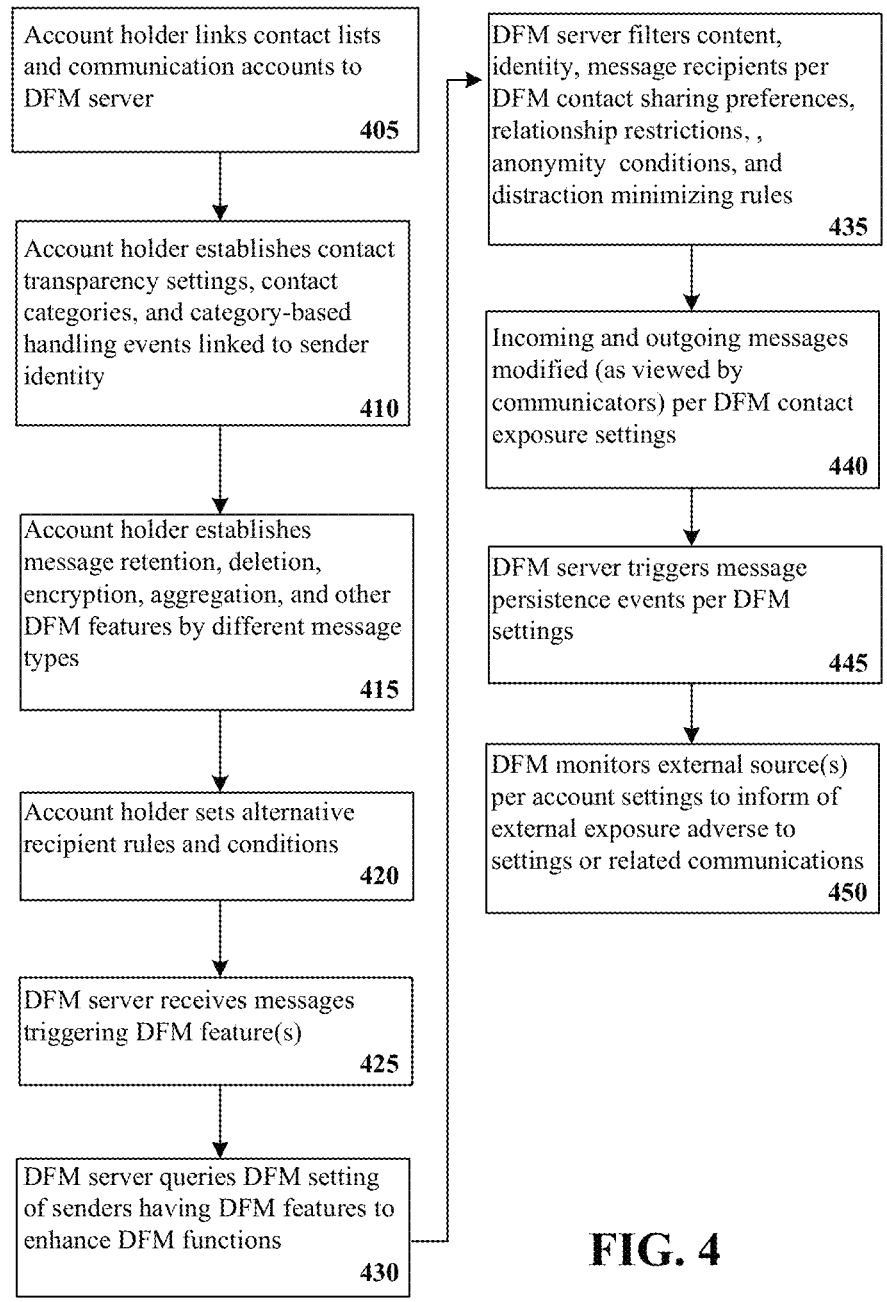
FIG. 4 shows a process for implementing non-conventional DFM functions in accordance with an embodiment of the disclosure.

FIG. 4 shows a process for implementing non-conventional DFM functions in accordance with an embodiment of the disclosure. The non-conventional DFM functions do not include the delayed messaging and aggregation functions already mentioned, although the functions detailed herein are able to interoperate. Non-conventional functions include an ability to designate different message types, which have different retention (and aggregation) properties. For example, a professional message is one that is to be retained and even indexed to a specific professional matter while a casual message may be related but is expressly designed to be not-reported or discarded. A simple context is understandable for a physician who receives professional communications concerning patients and maybe related, but informal ones from other physicians and/or a hospital. Casual messages need not be as concerned with precision and may be quick informal notes designed to be head's up to aid a person, yet by designation both the sender and recipient understand the message is not retained and incomplete. The cognitive overhead for professional and causal messages is different, and treating different messages in different ways by intuitive categories helps diminish the mental load on heavy communicators.

Another significant non-conventional feature relates to contact sharing, disclosure, and limitations. A simple example is psychologist/patient relationships are highly confidential and others are not permitted to be appraised of them without patient approval in many circumstances. However, treatment medication and circumstances may be highly relevant to a different treating doctor. Group-based messaging needs to strike a balance between communication confidentiality and ease. Similarly, many people have personal, business, and professional accounts that separate different spheres and groups of people in their lives. Maintaining boundaries between these spheres is important, which is handled through contact management DFM features. From a technology perspective, implementing many of these features has overlapping criteria, as similar changes are performed across these diverse features to base accounts. The nonconventional features associated with a DFM account are detailed briefly below and elaborated upon throughout this disclosure.

Turning to step 405, an account holder of a DFM account can link contact lists and communication accounts to his/her DFM account managed by the DFM server. In embodiments, the data represented by the contact lists and/or accounts may be maintained within a data store of the DFM server, which is directly accessed and indexed to perform DFM functions. In another embodiment, contact information and/or communication accounts may be valued and/or highly sensitive such that no copy is shared with the DFM server. Instead, the server references or indexes remote links by address to contact lists stored externally and/or to communication accounts. Rules and/or triggers are therefore able to be linked to these lists per DFM features without sensitive content even being known or exposed. In step 410, the DFM account holder establishes contact transparency settings, contact categories, and category-based handling events linked to the sender's identity in some cases. Importantly, the account holder is able to control the exposure of any contacts in subject, message type, and communicator specific manners.

In step 415, the account holder establishes message retention, deletion, cryptography, transport security restrictions, and other retention/transport settings by different message types and/or communication groups. A simple example is setting rules for retention, transport, and access for casual messages that differ from professional ones. Casual messages for a physician, for example, are shared with no one in a practice and are quickly deleted. Professional messages, however, may be stored automatically in-patient records, may be exposed to authorized physicians and nurses within a treatment group, etc. Simply, different types of messages have different retention rules, which are easily digestible to a communicator.

In step 420, an account holder can establish alternative recipient addresses, rules, and conditions for received messages. To elaborate, because of delayed messaging, a sender may find an issue relatively urgent and desire someone other than a target recipient to address a matter quickly. In a physician case, covering physicians may be available to handle urgent needs. Direct contact is not preferred in many of these cases, so instead an account holder can control and establish conditions for which it is permissible to redirect a message sender to another. The redirection may hide or reveal direct contact information. Similar rules for redaction may exist, for example, between a wife, husband, and emergency contacts for issues related to child-based emergencies. The message is properly delivered to a busy recipient and is able to be redirected to a set of one or more people to handle a situation, where identity and direct contact information may be sensitive and obscured depending on settings.

Once all recipient settings, rules, and selections have been recorded in the DFM server, the DFM server receives a set of messages triggering actions per DFM features, as indicated by step 425. In step 430, the DFM server queries DFM settings of senders having DFM features to enhance DFM functions. That is, although a recipient is able to establish DFM feature controlling settings, so can a sender. In many instances both sender and recipient DFM features are available. This permits DFM functions to be implemented in more fine-grained and targeted manners consistent with the sender and recipient settings/rules. For example, a sender may establish a preference list for a balance between having messages delayed or being redirected for handling by another, assuming these options are available. Thus, a recipient's options and timing for delays verse redirection (recipient's DFM settings) cooperatively work with a sender's preferences to transparently facilitate smooth flow of communications without expenditures of cognitive overhead on either communicator. When groups of people are intercommunicating with each other; each having different DFM settings, complicities for interactions grow, as should be understood.

In step 435, the DFM server filters content and identity of messages in accordance with sharing preferences, anonymity conditions, distribution restrictions, and other DFM settings. After the DFM server processes the messages to apply filters and rules, incoming and outgoing messages are viewed by the recipients/senders in accordance with established settings, as noted by step 440. The mechanisms used for sender/recipient interaction varies by context. For example, browser-based interfaces have direct access to the DFM server content/records but are unavailable offline, which allows significant control via access restrictions to be applied by the DFM server accessed via a browser-interface. When messaging applications having divergent features and offline retention capabilities are used, actual content of network conveyed messages may have to be altered. Further, additional DFM features may be linked to the message but not directly conveyed in embodiments, as receipt may require a live connection and permission from a DFM server at a post-message conveyance time. Context shall be elaborated upon in subsequent examples provided through the disclosure.

In step 450, the DFM server triggers message persistence events per applicable DFM settings. In some embodiments, this may result in remote triggering of message deletion events, of message conveyance events, etc. API access for external server functional integrations is utilized in embodiments. IN step 455, the DFM server monitors external sources per account settings to inform DFM account holders of external exposures adverse to settings or relevant to communications being conducted. Communications requiring confidentiality per a recipient's DFM settings may be re-forwarded or exposed, such as to public social media sites by one or more communication parties. Here, external sources can be automatically searched for inconsistencies with DFM preferences, and a DFM account holder is notified of these inconsistencies. This is a form of "privacy guard" or DFM consistency in embodiments. The DFM server may not be able to modify an external source's content (but it may be in embodiments where API available functions grant such abilities), but a sender/recipient is provided no personal-overhead (reduced cognitive load) to have a level of assurance that others are following agreed upon communication rules. Notifying or discovery of non-compliance with DFM message preferences can result in automatic or manually prompted DFM changes for that specific recipient. IN other words, the DFM features can increase transparency of violations and can attempt to reconcile discovered inconsistencies with DFM policies. Given the breadth of communication forums, including social media, public, semi-public, chat forums, email, instant messaging, etc., normal humans cannot viably manage/control unanticipated exposure of content. Moreover, determining rapidly when critical information is being mis conveyed is essential to controlling dissemination problems. These features, consistent with DFM settings, are contemplated herein; which overall improve communication efficiency while receding end user overhead.

FIG. 5 shows a process of implementing DFM features for a recipient account not directly associated with a DFM server in accordance with an embodiment of the disclosure. The DFM features of FIGS. 1-4 are able to be utilized herein, where the instant process elaborates on implementation specifics for extra-account integration of DFM functionality. In step 505, DFM functionality is linked to a set of accounts, which are recorded with the DFM server. In step 510, a recipient establishes DFM preferences for his/her accounts lacking native DFM handling. For example, a user's FACEBOOOK account may lack all DFM features, but the DFM server is able to monitor the FACEBOOK account (and/or messages posted therein) and trigger DFM functionality responsive to these communications. Since different platforms utilize different user names, passwords, protocols, etc., mappings of these accounts to individuals are part of the DFM server linking process. In step 515, the DFM server receives/monitors events for external recipient accounts, which triggers DFM functionality per settings of step 510. I embodiments, senders may possess a DFM accounts from with recipient-messages originate, which can facilitate DFM functionality for recipients even when the recipient account lacks such features, as noted by step 520. That is, having one end of the communication being natively linked to the DFM server greatly reduces monitoring overhead and triggering of DFM events. Further, the DFM sender account includes settings for DFM functionality and may include recipient-specific settings; including in embodiments settings able to be specified by non-account holding recipients.

In other embodiments, the external or linked account may have an API or other interface that is linked to the DFM server that ensures status and notifications are coordinated for triggering DFM events. In still other embodiments, a user may utilize a customized interface having some DFM awareness and links to the DFM server when interfacing with a linked account. Use of the customized interface (or a DFM plugin integrated into the linked account's application) ensures DFM server awareness of key messaging events needed to trigger DFM functionality.

In step 525, the DFM server is made aware of communication events specific to one or more account holder that is linked to a DFM functionality. Specific pre-message delivery functionality that is processed in step 525 can include delayed message delivery, content aggregation, and enforcement of transparency/contact sharing rules. The DFM server may or may not be able to completely effectuate preferred versions of the DFM functionality due to linked account constraints. However, it may be able to modify a message that is to be delayed to indicate that a sender sent a delayed message that will be delivered at a noted time per DFM rules; where at the time the sender's content will be conveyed instead of just the noted placeholder. Another example is that contacts can be obscured during message pre-processing so that otherwise exposed accounts may be turned into BCC addressees or may be otherwise obscured or hidden per recipient/sender DFM functionality settings. As noted in step 530, the DFM server modifies the message to be conveyed per processing rules and sends appropriate/complaint messages to target addresses. Pre-sending screening are easier in embodiments where the DFM server is contacted prior to or in conjunction with sending messages to linked account servers. Utilizing a proxy linking to the DFM server is one preferred method at this stage, use of APIs to coordinate between servers is another, use of customized applications with DFM plugins or functionality is still another.

Not all DFM functionality will be able to be addressed at the pre-sending stage, however. Accordingly, step 535 shows that communication accounts can be accessed, screened, updated, and filtered per DFM settings. This stage occurs during and/or post delivery in many instances. For example, a DFM account holder can receive a message from a linked account that includes an improper contact list entry. The DFM server can identity this breach of the recipient's preferences and can attempt to retract and/or recall the received message. Doing so may require contacting the sender, as in many instances' sender-specific preferences control message recall. The DFM server facilitates and monitors for these problems and in many instances corrects it relatively immediately. For example, within ten seconds of having sent a message, a sender informed that he/she exposed a private contact of a recipient to an unauthorized person will likely make a correction; especially when the DFM server pre-populates the correction or suggests the preferred alternative. If nothing else, a DFM account holder is informed of a potential problematic communication, which permits rapid responses as appropriate. Without this functionality, communications pervasively spread unchecked in many instances. For example, recently even during a democratic election private PINs for accessing secure applications were inappropriately shared over TWITTER, which was not noticed until corrections were effectively moot/impossible.

In step 540, API linkages to external servers, such as those hosting linked account communications, provide robust DFM functionality to these linked sites. The user facing interfaces available via the DFM applications may not be available, as APIs are often user-transparent and many messaging companies have their own reasons for preferring their unmodified user interfaces. The use of APIs and their availability, however, ensures that the DFM server is aware of communication events, can trigger DFM functionality processing, and can take actions to ensure its users' settings are enforced. For example, a DFM account holder may receive all communication messages through his/her DFM interface, even though other linked accounts having their own interfaces are available. The aggregation of messages in a manner designed to minimize distractions is a significant completive advantage that over time will be recognized by users and will be preferred over more distracting alternatively that provide no beneficial end-user features while unfortunately overly distracting its users. In embodiments, the DFM messaging application can include a number of front-end options that mimic conventional interfaces of linked accounts from a user-interface perspective while adding DFM functionality that minimizes overhead on users.

In step 545, the DFM server can forward messages to linked accounts and/or receive forwarded messages from linked accounts. Although not as convenient as direct API access in embodiments, the forwarding/conveying of messages permits the DFM server to record messages, extract context, compare messages to DFM settings, and to trigger DFM functionality. In embodiments, establishment of auto-forwarding rules, such as conveying different messages to an intake DFM mailbox, which are only forwarded to an inbox after DFM server processing is one way to implement DFM functionality by leveraging existing tools not expressly designed for DFM features. When DFM processing mailboxes are implemented in non-DFM interfaces/accounts, even delayed message delivery features can be implemented, as non-popular or hidden message delivery folders can be used to store "undelivered" or "pre-delivered" messages, which are only conveyed to user utilized "in" boxes at the time indicated for message delivery. Users have experienced mailbox induced delays through messages being trapped in JUNK or SPAM mail folders. These technology features are able to be adapted in non-conventional ways to facilitate DFM functionality, as noted.

In step 550, address proxying and redirection is expressly used to permit DFM server awareness and processing features. Numerous internet "nannies", privacy protection programs, and anti-malware applications utilize address proxying and redirection to protect sensitive computing areas and to minimize unwanted attacks or tracking. Here, these same techniques permit the DFM server and/or application to be looped into a messaging process, even those that occur through a browser and URL. For example, redirection at a sender's interface level prior to message conveyances enables the DFM server to prompt the user that a recipient's delivery is to be delayed per recipient DFM delayed receipt settings. Options to forward to an agent for faster responses, to indicate the message is actually urgent and to override recipient preferences, and the like can thereafter be provided. Similarly, recipients are able to utilize proxies/redirection to ensure that appropriate DFM aggregation functions occur, that contact privacy is maintained, etc.

Professional Messaging Embodiments for DFM

From the above, it is apparent that DFM features is beneficial to communicators in a myriad of context. One context that has especially complex requirements is that of professional messaging. Often customized professional messaging systems integrate with an intranet, a set of human agents, include records retention requirements, while concurrently involving texts and other short communications that are often handled ad hoc. Since a professional message delivery context is at present a notably complex situation or scenario, it is beneficial to detail the DFM features in this context. In other words, by elaborating upon the "most complex" situation, it is readily apparent how the DFM features are implemented in a less complex setting. Further, DFM features applicable in a professional context are able to be ported to causal and personal use. Towards this aim, the following descriptions are intentionally described DFM features tailored to a professional medical application. The medical application is especially challenging due to legal restrictions with regard to physician/patient communications, records restrictions and regulations, and the like. Further, physicians are among a growing set of professionals that disproportionately suffer from message overload or distractions that the DFM features mitigate.

Figure 6:
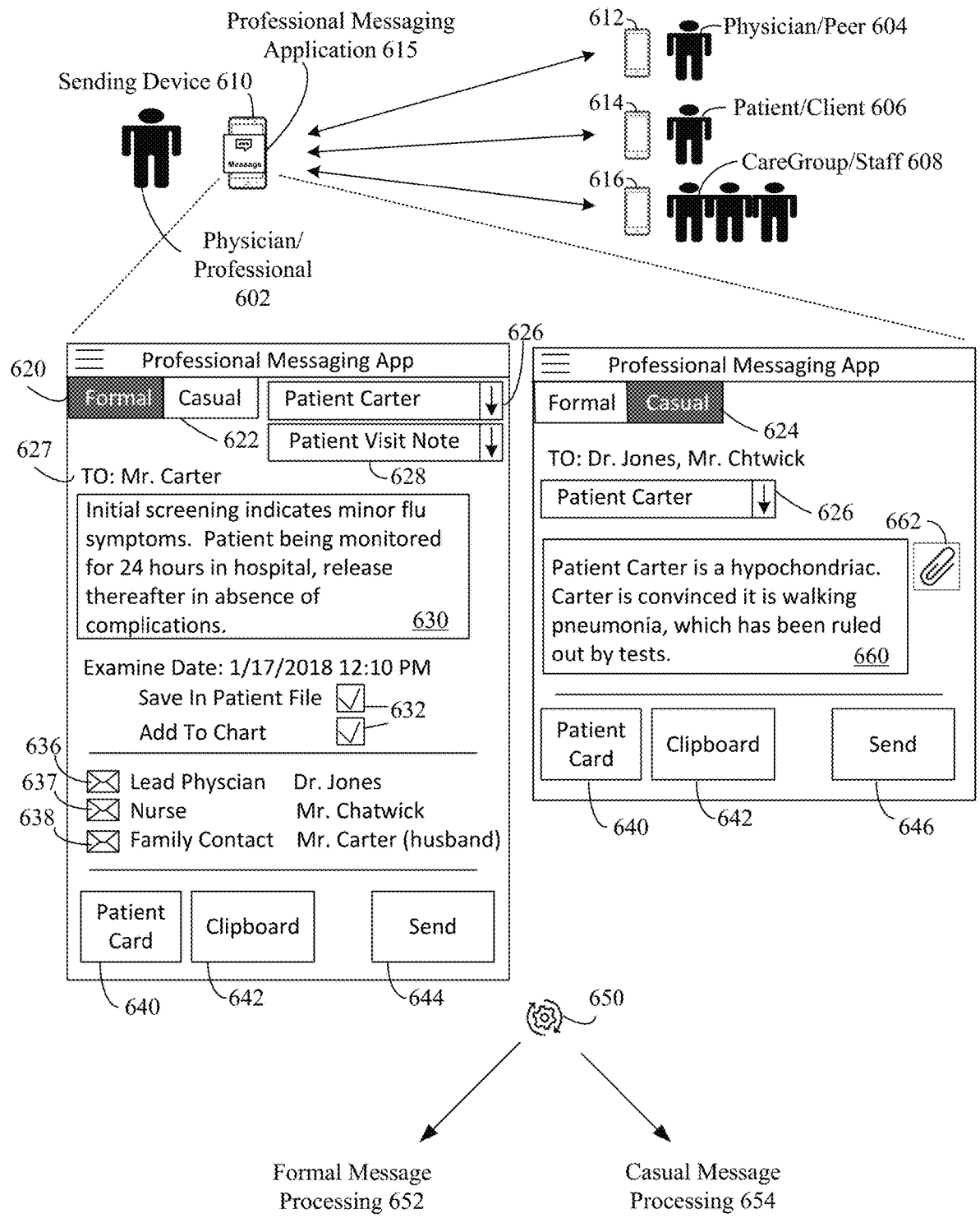
FIG. 6 shows an overview of a professional messaging application implementing DFM features in accordance with embodiments of the disclosure

FIG. 6 shows an overview of a professional messaging application implementing DFM features in accordance with embodiments of the disclosure. FIG. 6 specifically focuses on the different message-specific privacy settings, such as formal or casual messages. These features can be considered non-conventional DFM features, which function in cooperation with delayed message delivery and message aggregation functions. Other figures in the disclosure focuses on different contact specific privacy settings, such as private, open, or hidden contact settings. Together, the different privacy options provide a fine-grained level of protection for stakeholders in professional messaging without impeding the ease-of-use or intuitiveness of the user-used application.

The professional messaging application 615 can be the front-end or user interface component of a universal professional communication platform. Messaging application 615 is installable on a set of devices, referred to as sending device 610 and receiving devices 612, 614, and 616. In one embodiment, the messaging application 615 is a DFM application provided for download onto consumer electronic devices through an application store, such as GOOGLE PLAY or the APPLE APP STORE. Once installed, the application 615 permits a physician or other professional 602 to convey professional communications to physicians, peers, or other consultants 604, to patents or clients 606, as well as to a care group or support staff 608. The provisional messaging application 615 also permits selective levels of privacy and exposure of messages, in additional to the differing levels of privacy exposures, which are able to be established on a per entity basis as detailed herein.

As shown, conveyed messages are designated as either formal 620 or casual 624 messages. These are two of a number of possible privacy/handling designations shown for simplicity of expression and shown to detail that different message designations are processed in different manners and handled in different manners, despite the overall communication interface having a uniform look-and-feel. Other contemplated designations relating to contact privacy include private, open, and hidden. Private messages are ones that no one sees other than the explicit communicating entities, no connections with other caregivers are exposed with private designations and explicit processing consistent with this privacy setting occurs. Open contacts are exposed to all caregivers along with related service connections. Hidden contacts are ones that obscure a specific physician or patient, unless these connections are expressly added. It can be seen that the attribute "formal or causal" is a privacy and handling condition associated with a specific message, while other attributes such as private, hidden, and open are associated with contacts or individuals with which messaging occurs. The designated categories of Formal/Casual for messaging is not intended to be limiting and other category designations are contemplated as is the ability to have more than two different messaging categories. Similarly, the contact options of private, open, and hidden can be modified and still be within the spirit and scope of the disclosure as can the quantity of designated contact privacy options.

In embodiments, color coding schemes (such as changing a background and title blue for formal messages and green for casual ones) are implemented to ensure that senders (602) and recipients (604-608) are able to clearly distinguish among the different message types. Use of color to distinguish backgrounds of the various levels of message privacy ensure rapid identification and differentiation by end-users to minimize mistakes between users and the message type. When a message is sent (e.g., send 644), a process 650 determines the message type and initiates either formal message processing 652 or causal message processing 654, each being performed in accordance with appropriate policies/rules for that message type.

A formal message 620 is one that is placed in the professional record for the patient 626 is stored per formal document retention policies, and is conveyed in accordance with HIPA and other professional standards. A number of different service categories 628 for patients may exist in a user selectable fashion, which include a patient visit note. The different message types can have different standard fields associated with them. For example, formal message types 620 include the patient designator 626 and the service category 628, while no such fields are present for a causal message as shown.

The display of the formal 620 message may be automatically adapted/changed to match the appropriate fields of the message type, once the message type is selected. For example, when a service is for a patient visit note (628), specific information such as examination date, and options to save comments in a patient file or chart are displayed. Information for the specific formal message can be at least partially filed in by obtaining suitable information from a back-end system, which is in this case the care-giver's medical system. For example, assuming Patient Carter is admitted to a hospital, the hospital record system (back-end system) recorded the identity of the lead physician (Dr. Jones), the nurse in charge (Mr. Chatwick), and the family contact (Mr. Carter). This information is provided automatically in the message. The message sender can select one or more icons 636, 637, 638 to add these people as message recipients (in TO: block 627). Alternatively, a contact name or account may be entered as the recipient (not shown).

As shown, formal message content 630 is entered, which is conveyed to Mr. Carter and is saved to the patient file. In embodiments, entry into the professional messaging application may be automatically written to other formal documents, such as a patient chart to save the physician time/effort and to minimize duplicative efforts by the physician. In such an instance, a hospital staff member may be tasked with updating a paper chart. The Examination date and time may be automatically entered based on the time of message entry. In embodiments, voice recognition and automated transcription functionality are available to aid with inputting message content. The formal processing options above are shown in section 632 and are exemplary by nature to indicate a message writer may control some aspects of the formal message processing 632 is a straight forward manner, which varies by message type 628. The level of live integration to various back-end systems, such as a hospital system, will vary based on a hospital's technology infrastructure and level of participation in the professional messaging system. Relatively deep integrations are possible and contemplated, which improves information accuracy and efficiency for all professionals involved.

To aid the message writer (or professional message recipient), a patient card 640 can be placed in a user selectable location. The patient card 640 provides basic patient information helpful to the professional, such as name, age, insurer, and the like. Additionally, a clipboard 642 can be provided that provides a consistent an easy viewing/editing of notes, tasks, reminders, alerts, and the like. The clipboard 642 information may be shared among multiple professionals (different physicians', nurses, etc.) in embodiments. Sending 644 the message triggers formal message processing 652.

A casual message 624 to the lead physician and nurse is also shown for patient Carter 626. Content 660 of the casual message may indicate a private opinion to be shared with other professionals without placing this information on a formal file. As shown, the opinion that the patient is a hypochondriac is shared, which may be valuable information provided to busy care givers. Additional attachments 662, such as the results of the referenced tests can be attached to support the content 660. As with formal 620 messages, helpful information such as that of the patient card 640 and clipboard 642 can be included or linked to casual patient-centric messages. Sending 646 the message triggers casual message processing 654.

Message recipients may not see all the information provided to the sender in the message interface of the messaging application. Further, content of a message may be tailored for the recipient and may include information not directed entered by the sender. For example, the recipient (family contact) of formal message 620 may be presented with the content 630 of the message, examiner date/time information, hospital room information, visiting hour information, and the like. The additional information, such as hospital room may be automatically entered based on back-end system stored information. If multiple recipients are included in a message, the information can be tailored to the recipient (i.e., a nurse may be presented with the next time period for monitoring the patient in a message that includes content 630, while a physician recipient may receive the message content plus have access to the patient card 640 and clipboard 644.

Figure 7A:
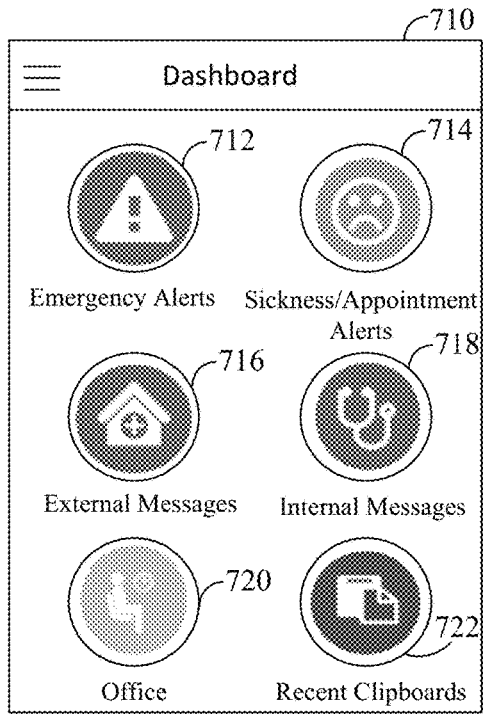
FIGS. 7A, 7B, 7C, and 7D shows the dashboard, patient card, and profile of the professional communication application, in accordance with an embodiment of the disclosure.
Figure 7B:
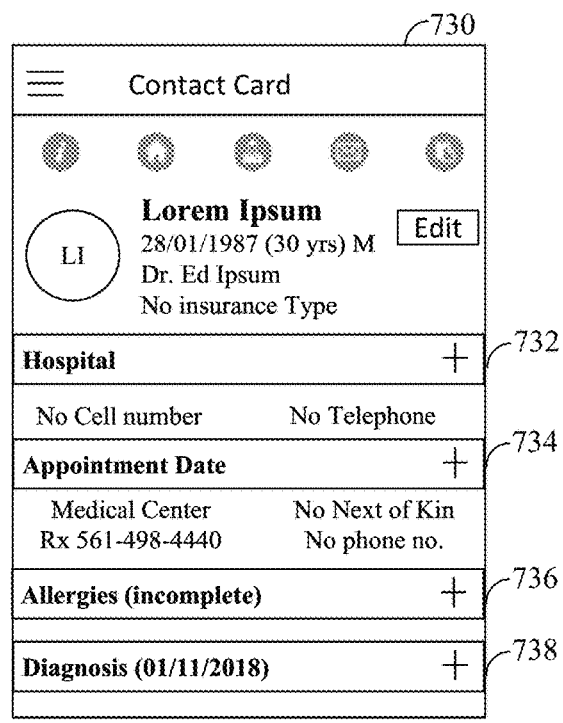
Figure 7C:
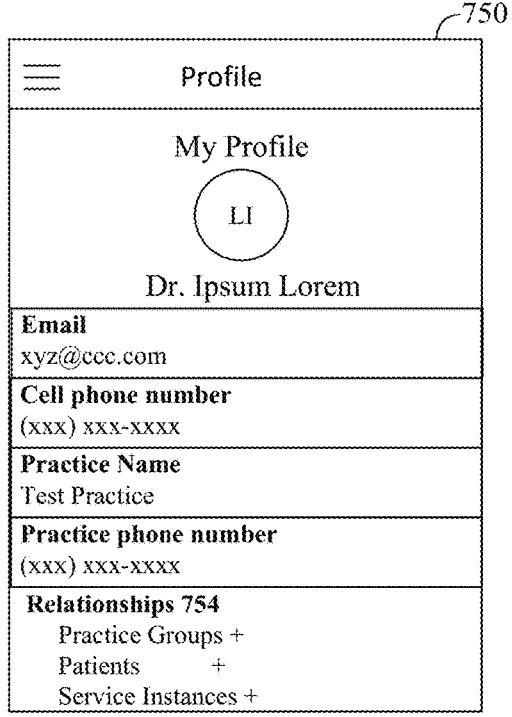
Figure 7D:
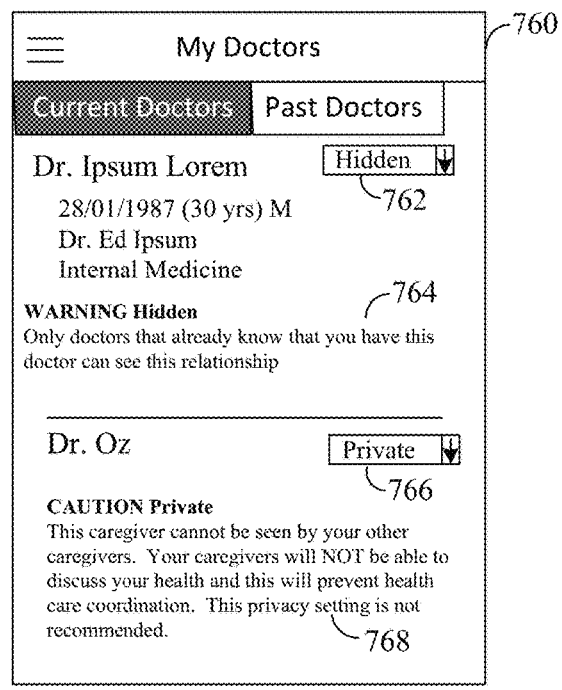

An overview of the professional communication application with DFM features is represented in FIGS. 7A, 7B, 7C, and 7D. FIG. 7A shows the dashboard 710, patient card, and profile of the professional communication application, in accordance with an embodiment of the disclosure. The dashboard 710 presents a set of emergency alert 712 option, a sickness or appointment alert option 714, an option for external messages 716 and internal messages 718, an office option 720, and a clipboard viewing option 722. Dashboard 710 organizes communications for patients and physicians (or other professionals) in an easy to digest manner. Effectively, dashboard is your mobile communication window to a wide variety of diverse information that helps prioritize a professional's priorities and messages and helps prioritize an end-users' (patients) needs in a specific professional field. Traditionally, this information is not aggregated or presented in a simplified and interactive manner. Importantly for patients, the information of the dashboard is not restrained to a particular physician, hospital, or even problem, but provides a linkage across different systems for a professional service area. Unlike personal messages, different professions often involve highly sensitive and segmented data from multiple systems that makes ingesting this information in a rapid form, challenging. The same is true for the professional providing services, as different entities (like hospitals, physician groups, labs, etc.) typically have their own data in proprietary formats making cross-application of data and cross-system prioritization a problem.

The emergency alerts 712 provides all matters that demand relatively immediate attention of a message users. For physicians, this can include health emergencies of patients, workplace emergencies of an office, high priority lab follow-ups, and the like. For caregivers, alerts can include immediate actions that are needed for patient and physician support. For patients, it includes critical alerts that can include times for taking high-impact prescriptions, appointment follow-ups, significant changes in scheduled care, and the like. As with all messages of the application, the alerts can be delivered across different systems. Sickness and appointment alerts 714 details matters for a specific professional need, such as changes in a condition that require immediate attention. Although sickness and appointment alerts 714 are segmented, in one implementation they can be implemented as a category of emergency alerts.

The external messages 716 represent messages from outside a professional system most used by an end-user. For physician's external messages 716 can include physician messages outside a network or professional group, messages from labs, messages from hospitals, and messages from patients. The internal messages 718 are expressly linked to a caregiver's internal system. Internal messages will often have significant confidentiality and conveyance constraints. Many communications are possible with internal messages that due to liability, confidentiality, or other matters are not viable for sending externally. Office 720 organizes communications specific to an office, such as a physician's office. Appointments, schedule, and other task-based items are presented under the office 720 option. For information stored in the clipboard (which is used across messages and otherwise distinct application areas) is able to be quickly viewed 722. This permits an ability to store any information that needs to be referenced by a user in the near future and to quickly recall it.

The dashboard 710 shown is one generally tailored for a physician with external (216), internal (218), and office (220) designations. A patient dashboard may include slightly different options, such as including options for "I have an emergency"; another for "I am sick"; another for "My Doctors"; another for "Appointments"; and a final for "Messages." Different professional services and different types of users can have customized dashboards. For example, although not shown, a "My Patients" entry can be included for a physician's dashboard.

The patient card 730 provides a detailed overview for a patient and/or physician including the most relevant information. Unlike a typical "contact" card, the patent card includes professional information, such as allergies, various diagnosis, previous appointments, key contacts, and the like. A physician treating a patient will be able to quickly access a patient card 730 prior to meeting with a patient to receive a rapid analysis of the relevant information. For example, hospital 732 specific information, appointments 734, allergies 736, diagnosis results 738 are all shown in a decomposable (can drill down in a hierarchy of information) and easy to digest manner. Additional entries, such as notes, insurance information, and the like are also presentable. A physician can tailor the attributes and information shown in embodiments. From a patient perspective, the contact card lists the key information about a specific physician, hospital, or care group.

Each contact, whether patient or physician, will be able to establish a profile as shown by screen 750. The profile can include information entered by an end-user that is sharable with others. Different information, such as a cell phone number, may be restricted for different recipients. For example, a cell phone number may be shared when a physician shares his information with a different physician, but not for information shared with patients in general. Some profile entries can include group entries, like entries for a hospital, for a practice, or other group. Group entries may selectively display lower-level profiles for all members of that group.

In one embodiment, calling up a profile, like the one for Dr. Ipsum Lorem, enables viewing of related contacts 754. For example, the display of Dr. Lorem can include an entry for his practice group 756 that shows all physicians of his group. In another example, the patients 758 of Dr. Lorem may be visible upon viewing the profile. Selecting a patient, can bring up the patient card 738. Selecting a professional can bring up the contact card 738 for that professional. Since the professional application is linked to multiple back-end systems, the set of relationships can be especially robust in embodiments. Further, the ability to cross-link a profile with patient cards, messages, alerts, clipboards, and other information relates in a strongly tied system to which context information in a professional setting is rapidly available to an end-user.

The robustness of the relationships, results in some potential privacy concerns, which are resolved by an inclusion of different privileges. The contact privileges determine whether specific inter-relationships are shown, hidden, or conditionally restricted. The "owner" of the contact can establish the relationship privacy attributes. Similarly, an end-user can intentionally tailor the interface to show/hide sets of available information to prevent information overload. To briefly elaborate on privacy attributes available to professional contacts, privacy settings of private, open, and hidden are implemented in embodiments. A private contact is one that is not generally available to patients or even other caregivers. Privacy need not be all-or-nothing, and different sub-classifications can be established for different groups of people. An open setting permits all other application users (of a certain type if so designated) to view the interrelationships between a contact and others. Filters may be used to restrict the level of information shown via the application. A hidden privilege on a contact permits some exposure to relationships, but this exposure is restricted based on the knowledge of the viewing end-user to this relationship. For example, if a patient works with three physicians' in a group (with a hidden attribute) of ten physicians, only those three physicians are visible to the patient. The exposure of hidden contacts can evolve over time, as if the patient sees a fourth member of the hidden group, the fourth member will be exposed. In one embodiment, the hidden attribute can be applied as an end-user filter so that even though the information has been exposed by the owner to the patient, the patient may choose to only view existing relationships per the filter. Alternatively, a patient seeing five different physicians can opt to hide one or more of them from the others. Thus, the only physician's seeing the patient/physician relationship of a hidden doctor are those physician's that have already been in communication with the hidden physician with regard to that patient's care.

It should be emphasized that the usage of the application (i.e., sending messages through the application) can automatically expose other hidden relationships and information. Thus, the privacy of an end-user in a professional context is maintained, but is not used to hinder professional care or to hinder groups of professionals interacting on a related professional matter (such as treating the same patient). It is also worth noting that by interlinking communications to contact and relationship privacy, minimal overhead to manually designate or restrict presentation of relationships is incurred.

Screen 760 shows a contemplated implementation of privacy settings for contacts on a patient's screen. Specifically, the set of current and past doctors and their relevant contact information are able to be shown. The privacy attribute 762 can be a user selectable one with options for Hidden, Private, or Open as disclosed. Hidden 762 designations may include a warning (at the time of establishment, on a fly-over, or shown next to the contact), such as 764 "WARNING: Only doctors that already know that you have this doctor can see this relationship. A contact with a "Hidden" privacy setting 766 can include a caution or warning such as 768 "CAUTION: This caregiver cannot be seen by your other caregivers. Your caregivers will NOT be able to discuss your health via this application and this will prevent health care coordination. This privacy setting is not recommended." As demonstrated, the privacy settings on relationships established by a relationship "owner" can affect coordination and messaging. These relationships establish a fair balance between ease of care and coordination and privacy not known to exist in any messaging application outside this disclosure.

Figure 8:
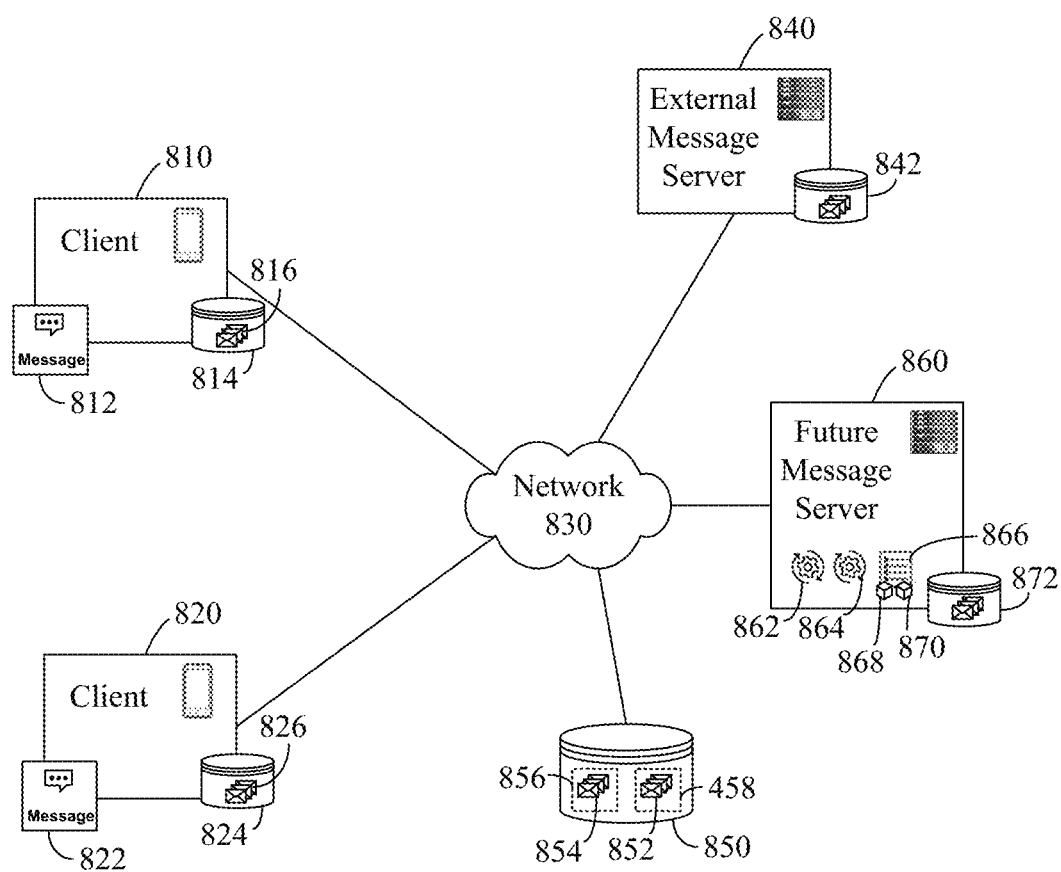
FIG. 8 shows a block diagram of a system for implementing privacy options for professional messaging in accordance with an embodiment of the disclosure.
Figure 9:
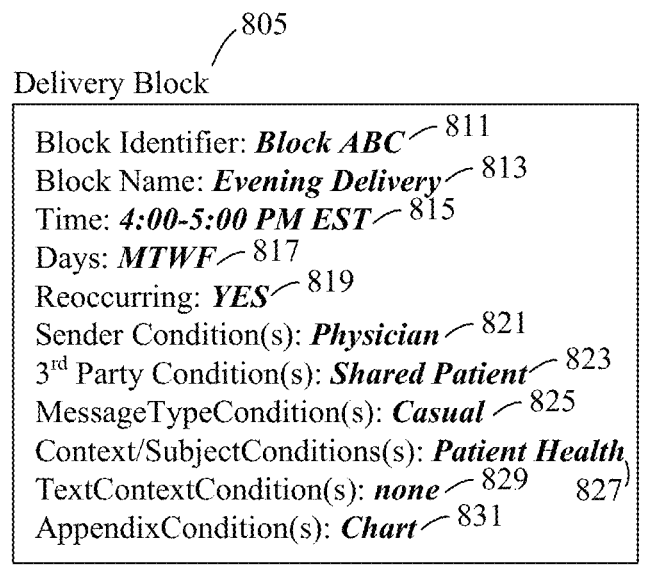
FIG. 9 shows a series of settings and documents used by a DFM server in embodiments of the disclosure.
Figure 9:
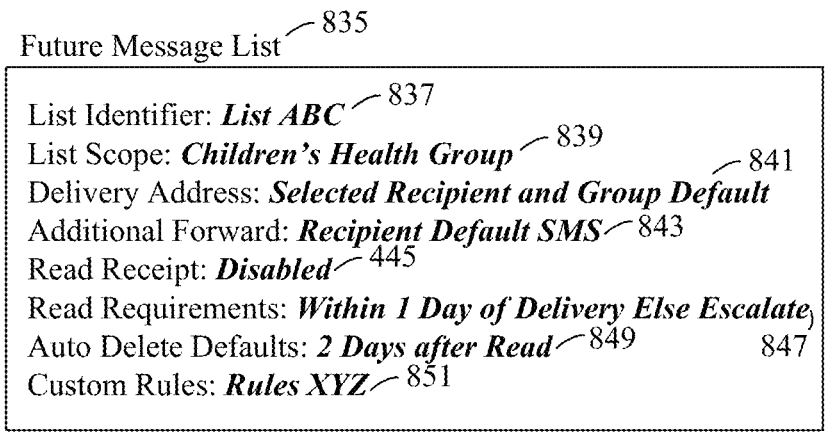
Figure 9:
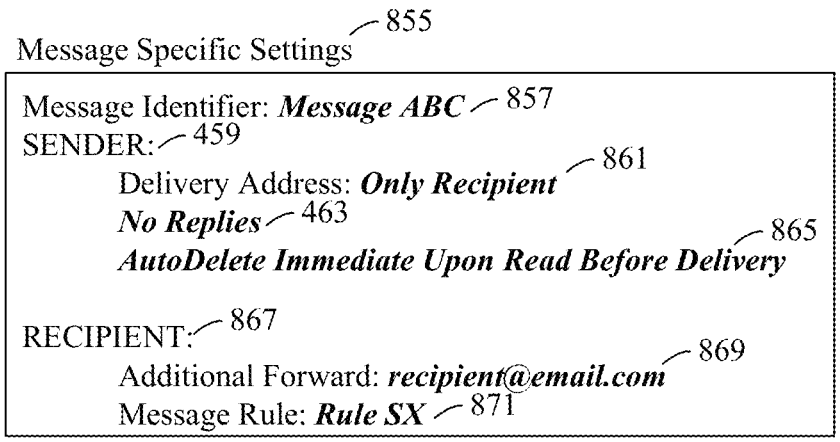

FIG. 8 shows a block diagram of a system for implementing privacy options for professional messaging in accordance with an embodiment of the disclosure. In FIG. 8, a message sending client 810 is communicatively linked by network 830 to a message receiving client 820, a formal message server 860, message data store 850, and a casual message server 840. Client 810 and 820 have a professional message application 812 and 822 installed thereon. The interfaces of FIG. 7A-D illustrate user interfaces and functionality available through applications 812 and 822. When a future message, also referred to as delayed message or delayed message delivery, is created by client 810 it is sent through network 830 to be stored in data store 850 as one of many future messages 854 in a future message storage space 856. Delivered messages 852 may also be persisted in data store 850 in a message storage space 858, which is distinct from space 856. The future message server 860 processes future messages 854 using a set of processing rules 862, time availability rules 864, and a future message list 866 having a defined set of delivery blocks 868 and 870, as shown by FIG. 9. At a designated time of delivery, a future message 854 become normal messages 852, which is delivered. At a time of delivery, a message is delivered over the network 830 to the intended recipient. Delivered messages may be stored on a local data store of a receiving client 820, as a stored message 826. The future message server 860 may use one or more external message servers 840 to deliver messages to receiving clients. These external deliveries can be for messaging applications, which are distinct from future messaging application 822, and which may lack any application-specific future messaging features. Delivery from an external message server 840 can be a configurable alternative to a delivery from server 860 or can occur in addition to message delivery from server 860 to messaging application 822.

In one embodiment, messages send and received from clients 810 and 820 need not be delivered and received on a one-to-one basis. Group messages sent to multiple destinations are contemplated. Professional messages conveyed to a group or to a service entity are able to be routed to suitable recipients that can be determined based on context. These determinations may be static or dynamically determined. Some messages conveyed between clients are automatically deleted from all data stores (local and remote) in accordance with conditions established by the sender, recipient, future message server conventions, or a combination thereof. Conveyed messages can also conform to state and federal regulations, such as HIPA standards. Messages may be encrypted and can also be conveyed over encrypted and secured communication channels in contemplated embodiments.

In one embodiment, future messages are intentionally absent from local data stores, especially that of a recipient. That is, although viewable using a future messaging application 822 interface, the future messages are security stored on at a data store 850 accessible over network 830. By not delivering future messages to sender's local data store, privacy of future messages is ensured. Further, limited local storage space is not consumed. Consequently, future messages are designed to minimize unnecessary computing resource expenditures on local devices as well as minimizing distractions to the users of recipient devices all while maximizing functionality available to users.

External message server 840 can be a message server lacking any specific future messaging functionality. Examples of external message servers 840 include email servers, text messaging serves, SMS servers, chat servers, social networking servers, RSS feed servers, Voice over Internet Protocol (VoIP) servers, fax servers, and the like. An external message server 840 may permit bidirectional communication between two or more people in real-time or near-real time in embodiments. In one embodiment, delivery rules 864 established on future message server 860 can specify any quantity and type of external message servers 840 that are directed to delivery message 828 at the specified time. The ability to deliver future messages 854 using external message servers 840 provides a means for easily integrating future message capabilities into legacy infrastructures and tools as preferred by senders and recipients.

One recipient may commonly check their personal text messages via their mobile phone, yet may not generally disclose the personal text message account for business reasons. Such a person is able to establish conditions upon which future messages are delivered to this private account. Doing so ensures the recipient's privacy is maintained and that the recipient is not overwhelmed or overly distracted with messages. Having this assurance created through the recipient established communication restrictions and conditions via future messaging functionality, communication avenues to rapidly convey information to a recipient are made available.

The processing rules 862 and time availability rules 864 are processes of the future message server 860 implemented in software or firmware. The processing rules 862 performs context related associations, facilitates information entry, automates formalizing of message content, performs complex routing of message, and provides features for professional message domains. In one embodiment, the processing rules 862 track all physicians and medical personal assisting with care of a particular patient, and coordinate messages among these professionals. This level of coordination may require integration with a number of other external systems, such as those of a hospital, those of various physicians, insurance companies, labs, and the like. A variety of complex rules are able to be established to ensure the processing flow of professional organizations is seamless. In one embodiment, messages from external systems can be automatically sent to appropriate professionals via in the future message system. In embodiments, the processing rules 862 can implement artificial intelligence, neural networks, and heuristics to automatically suggest information (such as a patient-specific message or portions thereof, as well as message types, and context/subjects) to minimize human time spent manually entering information. If a physician sends a future message based mentioning an X-ray for a specific patient, one of the processing rules 862 can seek the noted X-ray, determine availability, and ask the physician if the X-ray should be included in the message as an attachment. The processing rules 862 can advantageously utilize the time delta between future message creation and delivery to perform computationally expensive processes on content of a future message, which produces suggestions or enhancements to the future messages before delivery. For example, if a future message is to be sent from an English-speaking sender to a Japanese speaking recipient, message content is translated between languages automatically by processing rules 862 in one embodiment.

The time availability rules 864 are a set of rules that take advantage of information content present in the delivery block 805, the future message list 835, and the message specific settings 855 to implement future messaging specific functionality. Time availability rules 864 and processes permit the establishment of delivery blocks 805 by a recipient. These delivery blocks 805 inform recipients of when a future message may be delivered. A delivery block 805 includes a block identifier 811 that is a unique key as well as a block name 813, which is an alias for a specific delivery block like "Evening Delivery" or "Round Delivery". An absolute time, an absolute time range, or a relative time (relative to a time conditioned computing resource per rules 864) is recorded in a time element 815. A set of days of the week 817 for which the delivery time is available is specified. For example, the time 815 can be available only on Monday, Tuesday, Wednesday, and Friday per setting. Other days of the week or month are configurable. A reoccurring section 819 indicates whether the time 815 repeats for the delivery block 805 or is cyclically repeating. Sender conditions 821 provide specifics, conditions, and constraints related to the sender to which the delivery block 805 applies. Recipient conditions may override sender conditions 821 in the event of a conflict. For messages involving 3rd parties, third party conditions 823 are also established. As shown, the condition placed on the third party is that the sender physician and a recipient physician (or their groups) shares a patient. When a patient specified isn't shared, the delivery block having that condition is not made available for future message delivery. One or more conditions are also able to be placed on the delivery block for a given context/subject 827. For example, a context for a delivery block 805 could be restricted to a "patient health" context, where other conditions would not permit the delivery block 805 to be available for a given message. Text content conditions 829 are also specified, which restricts/permits delivery block availability based on keywords present/absent in the message. Appendix conditions 831 restrict availability of the delivery block based on a presence/absence of a particular type of attachment or appendix. As shown, the delivery block 805 is only available when an attachment with a patient's chart is attached to a future message.

Future message list 835 provides configurable data elements the control the delivery behavior of future messages. A unique list identifier 837 is included as is a list scope 839. List scope 839 represents meets and bounds for which a specific message list 835 configuration applies. Different medical service groups, different professions, types of senders, recipients, and the like can each have its own future message list associated. A default delivery address or set of delivery addresses 841 is stored that controls message routing behavior. As shown, a specific medical group indicates their generalized preferences for delivery of future messages applicable to all physicians in the group. Additional forward defaults 843 are configured for the message list with information specifics. For example, many recipients check their personal text messages more than they will check other message sources so message delivery for professional messages may also default to a personal text message application. Each individual physician, in a group, will have their own address, which is configured. Further, individual physicians may override the group defaults in embodiments. Element 845 is a data configuration for enabling/disabling read receipts for future messages that are viewed before delivery. Additional configurations for read receipts on delivered messages are also contemplated. Item 847 provides constraints, conditions, behavior for any default read conditions. For example, if a delivered message is not read within 1 day of delivery, an "escalation" process can be triggered to ensure some professional in the group pays attention to the professional message. Automatic delete defaults for future and delivered messages 849 are configurable for a specific future message list 835. Additional rules, which may be customized rules 851 written for a particular list 835 are contemplated. Various script languages, program languages, and GUI based tools may be available for creating the customized rules in contemplated embodiments.

Message specific settings 855 establish configurable rules/settings that override higher level defaults for a particular message. Conflict resolution rules (part of processing rules 862 and/or time availability rules 864) are established by the future message server 860 to resolve conflicts. The settings 855 include a message identifier 857 and a set of senders 859 specific message settings and a set of recipients 867 specific message settings. The sender specific settings 859 include a delivery address constraint 861. For example, if a sender specifies that only the recipient is able to receive a message other defaults permitting routing are disabled. A different setting would still permit routing to others, but would require permission/expressed authorization from the sender. A replies 863 setting can restrict whether a sent message is able to be forwarded to others. It is common for people to add non-sender recipients to a communication string, which includes sent content. This setting can permit the sender a higher level of control with regard to message replication beyond an initial set of recipients. Autodelete criteria 865 for a sender's message can be established, such as immediately deleting a future message after it is viewed, in one instance. Recipient's may provide additional forwarding options 869, such as specifying all messages be conveyed to a particular email address unless other constraints on the delivery behavior prevent such a forward. Custom rules 871 are also available to both the sender and the recipient, which are similar in nature to list custom rules 851. Since the future message server 860 may not be able to control post-delivery behavior of an outside system (i.e., external message server, non-application 822 delivery target) constraints on post-delivery handling of a message may restrict whether that message is conveyable through an external messaging server 840 and/or to specific client running message applications.

The details present in the delivery block artifact 805, the future message list artifact 835, and the message specific setting artifact 855 are provided for illustrative purposes and to demonstrate that low level specifics for implementing complex delivery rules are contemplated herein. The disclosure is not to be limited in scope to the specific data elements, structures, and rules detailed herein. Instead, one of ordinary skill recognizes that derivatives and alternatives are contemplated which have equivalent or similar functionality with respect to future messages to those explicitly expressed herein.

Clients 810 and 820 and servers 840 and 860 are computing devices that include one or more processors, circuitry, operating systems, programs, firmware, and other such components. The client's 810 and 820 may be mobile communication devices, such as mobile phones and tablets. Clients 810 and 820 may also be personal computers, notebook computers, wearable devices, or home entertainment devices. Servers 840 and 860 may be discrete computing devices or a set of distributed computing devices that together perform a defined and controlled set of computing functions.

Data stores of clients 810 and 820, servers 840 and 860, and/or data store 850 can be a hardware/software component able to persist information stored therein. Each data store is a non-transitory storage medium or collection of storage mediums. Data stores can be a Storage Area Network (SAN), Network Attached Storage (NAS), a local storage medium, and the like. Data stores can conform to a relational database management system (RDBMS), object-oriented database management system (OODBMS), a flat file storage system, and the like. Data stores can be communicatively linked to servers and clients in one or more traditional and/or proprietary mechanisms. In one instance, data stores include components of Structured Query Language (SQL) complaint database.

Network 830 can be an electrical and/or computer network connecting one or more system components. Network 830 can include, but is not limited to, twisted pair cabling, optical fiber, coaxial cable, and the like. Network 830 can include any combination of wired and/or wireless components. Network 880 topologies can include, but is not limited to, bus, star, mesh, and the like. Network 830 types can include, but is not limited to, Local Area Network (LAN), Wide Area Network (WAN), VPN, a personal area network (PAN), an adhoc network, a peer-to-peer network, a client-server network, and the like.

Figure 10:
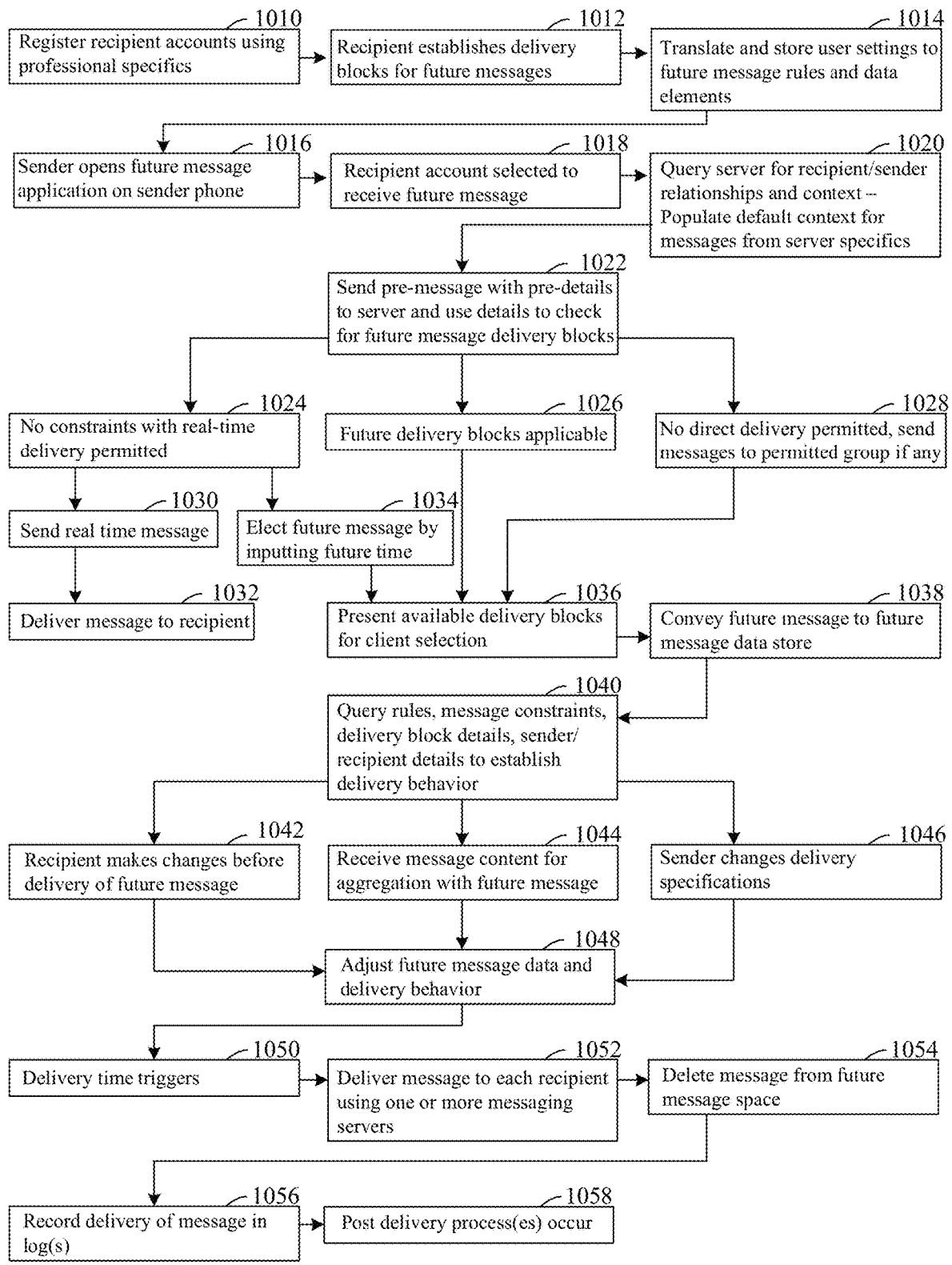
FIG. 10 shows a flow chart for a future messaging process in accordance with an embodiment of the disclosure.

FIG. 10 shows a flow chart for a future messaging process in accordance with an embodiment of the disclosure. In step 1010, recipients and senders register with a future messaging server providing any professional service specifics that apply to them. For example, each physician may specify the medical group with which they work, provide a set of hospitals that they are authorized to perform rounds at, provide access to external systems to enable some level of patient lists to be shared or accessed, and the like. Different professionals will have different rules associated with them for future messages and for message delivery behavior. In step 1012, a recipient establishes a set of delivery blocks and their specifics to establish delivery times at which future messages are authorized. The settings provided by users, such as a sender or recipient, may need to be translated or converted into lower level details used by the future message system (such as translating high-level settings to the artifact specific details of FIG. 4B). In step 1014, user settings can be translated and established within the future message server as proper messaging rules and elements.

In step 1016, a sender opens a future messaging application, which may be running on the sender's phone. In step 1018, the sender can specify a recipient account to which a message being constructed is to be delivered by the future messaging server. In order to determine which message delivery blocks are appropriate or available, a future message server may need to be queried. Step 1020, queries the future message server for recipient/sender relationship details and context that affects future message delivery behavior. In one embodiment, a sender's interface can be automatically populated (by defaults) based on results of this query. For example, if the sender/recipient are both recipients that share one patient and the sender items indicate the message is professional; specifics for that patient can be pre-populated on the sender's interface; subject to sender change. In step 1022, the sender can confirm details for the message and send these details to the future message server. These confirmed details are used to determine message delivery times and options that are available.

As shown by step 1024, the server can determine that there are no delivery constraints and that a message is able to be immediately delivered. The sender may still elect to enter an open time for future message delivery, as shown by step 1034. Otherwise, a message can be sent in real time (step 1030) and delivered to the recipient (step 1032). Results from step 1022 may determine that immediately delivery of a message is not available, and that a set of delivery blocks for future messages are available (step 1026). If so, the delivery blocks available are presented to the sender via a user interface for selection (step 1036). The selection by the user determines a future delivery time for a future message. Results from step 1022 may indicate that for the given sender/recipient no delivery blocks are available for direct communication of a future message. A common situation where this may occur is some physicians may not permit direct messages from many patients, yet these messages entered by a patient sender are still desired. A sending option for a different person (other than the selected sender) may be provided (step 1028). This different person may be a call center, an administrative system, or other such person (as configured by the rules of the future message server).

Assuming a future message and message time is established by the process content and specifics of such a message are added by the sender. The future message is conveyed to the future message server to be stored in a future message space of a networked data store (step 1038). In step 1040 after storing the future message, rules, message constraints, delivery block details, sender/recipient details can be queried to establish or constrain delivery behavior. Computationally expensive actions (such as translating content, performing image analysis and finding related content, and the like) can be performed in the background when computing cycles are available. Since the future message is not delivered, latency issues for these expensive processes are not a significant factor. A number of actions may occur between future message establishment and a delivery time. For example, a sender may retract, delete, change, future message content as indicated by step 1042. Additional content or messages may be received (by the sender or others) that are to be aggregated with the future message which occurs at step 1044. The recipient of the future message may change his/her delivery specifics, delivery block details, or other future message settings that affect the pending delivery, as indicated by step 1046. Reading or pre-viewing the future message by the recipient may also change delivery behavior at step 1046. Each time a delivery affecting change occurs (steps 1042, 1044, or 1046) the future message delivery data and/or delivery behavior are changed as indicated by step 1048.

A current time eventually matches the delivery time, at which point the delivery of the future message triggers (step 1050). Once triggered, the delivery message is delivered to each designated recipient using one or more message delivery servers to one or more application destinations/accounts (step 1052). In step 1054, the deleted message is deleted from the future message space so that the future message is no longer stored. If any local storage spaces exist that had a copy of the future message, each is updated to either delete the future message or to change it to a delivered one. In step 1056, delivery of the message is recorded in a log of each message delivery server involved. In step 1058, post-delivery processes occur for the delivered message.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing communications software to minimize recipient distractions from receiving messages comprising:

receiving, at an application running on a computing device of an application user referred to as a sender, input for a message to a recipient address;

prior to the application sending the message via a remote server, the application communicating the recipient address to a distraction free messaging (DFM) server;

the DFM server querying settings established by a recipient linked to the recipient address to determine a delivery time for the message, wherein the delivery time is an hour or greater from a time of the querying, wherein the recipient expressly established the queried settings with the DFM server to restrict times during which messages are conveyed to the recipient address to reduce distractions experienced by the sender from receipt of received messages;

the DFM server querying the settings to determine contacts to display in the message, wherein the contacts is based on the recipient established DFM settings and includes at least one contact from a communication platform external to that over which the message is delivered; and the DFM server modifying visible contacts in the message to include the at least one contact from the external communication platform and to hide at least one contact entered by the sender per the DFM settings;

the DFM server conveying over a network choice for the delivery time possible for that recipient to the application running on the computing device of the sender;

prior to receiving a user command to send the message, the application visually presenting delay choice notice of a delivery delay choice consistent with the determined delivery time as conveyed from the DFM server to the computing device, wherein by default, the application delivers a message from the sender in real or near real time without the delivery delay choice, wherein the sender did not initiate the delivery delay choice, wherein presentation of the delivery delay choice to the sender informs the sender of the delivery delay choice, which adjusts the sender's expectations of when to anticipate a response, wherein the sender takes business and legal responsibility for any delivery delay per the delivery delay choice and the recipient is spared distraction until a set time established by the recipient;

upon receiving a send command from the application, conveying the message over the network from the computing device of the sender to a communications server, wherein the message is delivered to the recipient's account at the delivery time, wherein prior to the delivery time the recipient is permitted to preview the message via a distraction free message application operating in a pre-delivery mode; and at the recipient scheduled delivery time consistent with the delay delivery choice, the communication server delivering the message to the recipient address enabling the recipient to view the message as a delivered message, wherein once a recipient views a message whether as a delivered message or in pre-delivery mode, the message is classified as received and the recipient becomes responsible for acknowledging content delivery has occurred.

2. The method of claim 1, wherein the application permits the sender to retract the message after the send command was sent and before the delivery time occurs, which results in the message not being sent to the recipient's account.

3. The method of claim 1, wherein the recipient address is for a business-specific account, wherein the DFM settings established by the recipient establish different delivery times and delays for different sets of senders depending on a sender's business relationship, messages characteristics as per manual selection or per Artificial Intelligence or "AI" establishment from recipient settings, with the recipient.

4. The method of claim 3, wherein the sender provides professional services to a set of clients, wherein multiple messages are conveyed related to the professional services being provided to the recipient account, wherein upon the recipient indicating a client-specific activity through the distraction free messaging application, the recipient is presented with messages relevant to the client-specific activity including the message in a pre-delivery stage, assuming the message is relevant to the client-specific activity, wherein absent a recipient-driven action to pull information for the recipient, the message is not delivered or otherwise presented to the recipient until the delivery time.

5. The method of claim 3, wherein once delivered, messages directed to the business-specific account are persisted in professional business records maintained for the recipient indexed against a specific client of the recipient, wherein prior to the delivery time the message is not persisted in the professional business records.

6. The method of claim 1, further comprising:

upon visually presenting the notice of the delivery delay choice, the application presents the sender with an option to expedite handling of the message through delivery to an agent of the recipient prior to the delivery time, wherein the agent is a human having a not displayed delivery address, which is not presented to the sender and has not been entered by the sender; and upon detection of a sender's election of the option to expedite handling, conveying the message to the not displayed delivery address in real or near real time, wherein identity information of the agent and not displayed delivery address is intentionally hidden to minimize overt distractions and forwarding of messages directed to the recipient while permitting an avenue to have more urgent messages handled in an expedited fashion despite the delay specified by the recipient.

7. The method of claim 1, wherein the distraction free message application of the sender permits previewing of a message in the pre-delivery mode by:

presenting an option within a user interface of the distraction free message application for the recipient to receive a notification of pending messages delayed per the recipient's settings, where the user interface permits the sender to override the delivery time for pending messages such that specific recipient selected pending messages are expedited for delivery prior to a respective delivery time.

8. The method of claim 1, wherein the distraction free messaging application organizes and presents received messages directed to the recipient in a listing by time of delivery, wherein the message shows up on the received message of the listing at the delivery time and is organized relative to other messages by the delivery time.

9. The method of claim 1, wherein the distraction free messaging application presents a tactical or audible notification to the recipient upon receipt of a message, wherein inclusion of a delay represented by the DFM server established delivery time ensures that distractions from receipt of the tactical or audible notifications are minimized during times outside of windows established by the recipient for delivery of messages including the message.

10. The method of claim 1, further comprising:
the DFM server querying the settings to determine content to aggregate with the message, wherein the content to aggregate is based on recipient established DFM settings and includes external content targeting a recipient of the recipient not received at the recipient address;
the DFM server modifying the message to include the external content added or linked to the message by the DFM server per the DFM settings.

11. A method for implementing communications software to minimize recipient distractions from receiving messages comprising:
receiving, at an application running on a computing device of an application user referred to as a sender, input for a message to a recipient address;
upon receiving a user command to send the message, conveying the message to the recipient address;
receiving a notice of a delivery attempt of the message to the recipient address at a distraction free messaging (DFM) server managing a communication account linked to the recipient address;
the DFM server querying settings established by a recipient linked to the recipient address to determine a delivery time for the message, wherein the delivery time is an hour or greater from a time of the querying, wherein the recipient expressly established the queried settings with the DFM server to restrict times during which messages are conveyed to the recipient address to reduce distractions experienced by the sender from receipt of received messages;
prior to the DFM server delivering the message to the recipient address, the DFM server conveying over a network the delivery time to the application running on the computing device of the sender;
prior to the DFM server delivering the message to the recipient address, the application of the sender visually presenting notice of a delivery delay consistent with the determined delivery time, wherein by default, the application delivers a message from the sender in real or near real time without the delivery delay, wherein the sender did not initiate the delivery delay, wherein presentation of the delivery delay to the sender informs the sender of the delivery delay, which adjusts the sender's expectations of when to anticipate a response;
upon visually presenting the notice of the delivery delay, the application presents the sender with an option to expedite handling of the message through delivery to an agent of the recipient prior to the delivery time, wherein the agent is a human having a not displayed delivery address, which is not presented to the sender and has not been entered by the sender; and
upon detection of a sender's election of the option to expedite handling, conveying the message to the not displayed delivery address in real or near real time, wherein identity information of the agent and not displayed delivery address is intentionally hidden to minimize overt distractions and forwarding of messages directed to the recipient while permitting an avenue to have more urgent messages handled in an expedited fashion despite the delay specified by the recipient; and
at the delivery time, the DFM server delivering the message to the recipient address enabling the recipient to view the message as a delivered message, wherein prior to the delivery time the recipient is permitted to preview the message via a distraction free message application operating in a pre-delivery mode.

12. The method of claim 11, wherein the recipient address is for a business-specific account, wherein the DFM settings established by the recipient establish different delivery times and delays for different sets of senders depending on a sender's business relationship with the recipient.

13. The method of claim 11, wherein the application permits the sender to retract the message after the send command was sent and before the delivery time occurs, which results in the message not being sent to the recipient's account.

14. A method for implementing communications software to minimize recipient distractions from receiving messages comprising:
receiving, at an application running on a computing device of an application user referred to as a sender, input for a message to a recipient address;
receiving a notice of the message from the application to the recipient address at a distraction free messaging (DFM) server managing a communication account linked to the recipient address;
the DFM server querying settings established by a recipient linked to the recipient address to determine a delivery time for the message, content to aggregate with the message, and contacts to display in the message, wherein the delivery time is an hour or greater from a time of the querying, wherein the recipient expressly established the queried settings with the DFM server to restrict times during which messages are conveyed to the recipient address to reduce distractions experienced by the sender from receipt of received messages, wherein the content to aggregate is based on recipient established DFM settings and includes external content targeting a recipient of the recipient not received at the recipient address, wherein the contacts is based on the recipient established DFM settings and includes at least one contact from a communication platform external to that over which the message is delivered;
the DFM server conveying over a network the delivery time to the application running on the computing device of the sender;
at the delivery time, the DFM server delivering the message to the recipient address enabling the recipient to view the message as a delivered message, wherein prior to the delivery time the recipient is permitted to preview the message via a distraction free message application operating in a pre-delivery mode;

the DFM server modifying the message to include the external content added or linked to the message by the DFM server per the DFM settings; and the DFM server modifying visible contacts in the message to include the at least one contact from the external communication platform and to hide at least one contact entered by the sender per the DFM settings.

15. The method of claim 14, wherein the application communicates the recipient address to the DFM server prior to the application sending the message via a remote server, the method further comprising:

the DFM server conveying over a network the delivery time to the application running on the computing device of the sender;

prior to receiving a user command to send the message, the application visually presenting notice of a delivery delay consistent with the determined delivery time as conveyed from the DFM server to the computing device, wherein by default, the application delivers a message from the sender in real or near real time without the delivery delay, wherein the sender did not initiate the delivery delay, wherein presentation of the delivery delay to the sender informs the sender of the delivery delay, which adjusts the sender's expectations of when to anticipate a response; and upon receiving a send command from the application, conveying the message over the network from the computing device of the sender to a communications server, wherein the message is delivered to the recipient's account at the delivery time, wherein prior to the delivery time the recipient is permitted to preview the message via a distraction free message application operating in a pre-delivery mode.

16. The method of claim 14, wherein the application communicates the recipient address to the DFM server prior to the application sending the message via a remote server, the method further comprising:

upon receiving a user command to send the message, conveying the message to the recipient address;

receiving a notice of a delivery attempt of the message to the recipient address at a distraction free messaging (DFM) server managing a communication account linked to the recipient address; wherein the delivery time is an hour or greater from a time of the querying, wherein the recipient expressly established the queried settings with the DFM server to restrict times during which messages are conveyed to the recipient address to reduce distractions experienced by the sender from receipt of received messages;

prior to the DFM server delivering the message to the recipient address, the DFM server conveying over a network the delivery time to the application running on the computing device of the sender; and prior to the DFM server delivering the message to the recipient address, the application of the sender visually presenting notice of a delivery delay consistent with the determined delivery time, wherein by default, the application delivers a message from the sender in real or near real time without the delivery delay, wherein the sender did not initiate the delivery delay, wherein presentation of the delivery delay to the sender informs the sender of the delivery delay, which adjusts the sender's expectations of when to anticipate a response.

17. The method of claim 14, wherein the recipient address is for a business-specific account, wherein the DFM settings established by the recipient establish different delivery times and delays for different sets of senders depending on a sender's business relationship with the recipient.

18. The method of claim 14, wherein the application permits the sender to retract the message after the send command was sent and before the delivery time occurs, which results in the message not being sent to the recipient's account.

* * * * *